United States Patent
Mizoguchi et al.

(10) Patent No.: US 11,904,468 B2
(45) Date of Patent: *Feb. 20, 2024

(54) ROBOTIC MULTI-GRIPPER ASSEMBLIES AND METHODS FOR GRIPPING AND HOLDING OBJECTS

(71) Applicant: MUJIN, Inc., Tokyo (JP)

(72) Inventors: Hironori Mizoguchi, Tokyo (JP); Rosen Nikolaev Diankov, Tokyo (JP)

(73) Assignee: Mujin, Inc., Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 17/723,258

(22) Filed: Apr. 18, 2022

(65) Prior Publication Data

US 2022/0241963 A1 Aug. 4, 2022

Related U.S. Application Data

(63) Continuation of application No. 16/855,751, filed on Apr. 22, 2020, now Pat. No. 11,345,029.

(Continued)

(51) Int. Cl.
 *B25J 13/08* (2006.01)
 *B25J 9/16* (2006.01)
 (Continued)

(52) U.S. Cl.
 CPC ........... *B25J 9/1612* (2013.01); *B25J 9/1653* (2013.01); *B25J 9/1664* (2013.01); *B25J 9/1669* (2013.01);
 (Continued)

(58) Field of Classification Search
 CPC ........ B25J 9/1664; B25J 9/1612; B25J 13/08; B25J 9/1697; B25J 19/023; B25J 9/1669;
 (Continued)

(56) References Cited

U.S. PATENT DOCUMENTS

| | | |
|---|---|---|
| 7,017,961 B1 | 3/2006 | Parnell et al. |
| 9,089,969 B1 | 7/2015 | Theobald |

(Continued)

FOREIGN PATENT DOCUMENTS

| | | |
|---|---|---|
| CN | 101296611 A | 10/2008 |
| CN | 101618544 A | 1/2010 |

(Continued)

OTHER PUBLICATIONS

Domae et al., Fast graspability evaluation on single depth maps for bin picking with general grippers, 2014, IEEE, p. 1997-2004 (Year: 2014).*

(Continued)

*Primary Examiner* — McDieunel Marc
(74) *Attorney, Agent, or Firm* — Perkins Coie LLP

(57) ABSTRACT

A method for operating a transport robot includes receiving image data representative of a group of objects. One or more target objects are identified in the group based on the received image data. Addressable vacuum regions are selected based on the identified one or more target objects. The transport robot is command to cause the selected addressable vacuum regions to hold and transport the identified one or more target objects. The transport robot includes a multi-gripper assembly having an array of addressable vacuum regions each configured to independently provide a vacuum. A vision sensor device can capture the image data, which is representative of the target objects adjacent to or held by the multi-gripper assembly.

20 Claims, 14 Drawing Sheets

Related U.S. Application Data

(60) Provisional application No. 62/889,562, filed on Aug. 21, 2019.

(51) Int. Cl.
  *B25J 15/06* (2006.01)
  *B25J 19/02* (2006.01)
  *B25J 19/04* (2006.01)

(52) U.S. Cl.
  CPC ............ *B25J 9/1697* (2013.01); *B25J 13/08* (2013.01); *B25J 15/0616* (2013.01); *B25J 19/022* (2013.01); *B25J 19/023* (2013.01); *B25J 19/04* (2013.01); *G05B 2219/39553* (2013.01); *G05B 2219/39558* (2013.01); *G05B 2219/40006* (2013.01)

(58) Field of Classification Search
  CPC .... B25J 15/0052; B25J 9/1653; B25J 19/022; B25J 15/0616; B25J 19/04; B25J 19/021; G05B 2219/40006; G05B 2219/39553; G05B 2219/39558; G05B 2219/40604
  See application file for complete search history.

(56) References Cited

U.S. PATENT DOCUMENTS

| | | | |
|---|---|---|---|
| 9,333,649 | B1 | 5/2016 | Bradski et al. |
| 9,393,693 | B1 | 7/2016 | Kalakrishnan et al. |
| 10,124,489 | B2 | 11/2018 | Chitta et al. |
| 10,207,868 | B1 | 2/2019 | Stubbs et al. |
| 10,576,630 | B1* | 3/2020 | Diankov ............... B25J 9/1633 |
| 11,117,256 | B2* | 9/2021 | Diankov ............... B25J 19/023 |
| 11,345,029 | B2* | 5/2022 | Mizoguchi ........... B25J 15/0052 |
| 2010/0222915 | A1 | 9/2010 | Keuhnemann et al. |
| 2018/0032225 | A1 | 2/2018 | Patil |
| 2018/0040132 | A1 | 2/2018 | Eto et al. |
| 2018/0162660 | A1* | 6/2018 | Saylor ..................... B65G 57/03 |
| 2019/0030730 | A1* | 1/2019 | Tanaka ................... B25J 13/087 |
| 2019/0047158 | A1* | 2/2019 | Petrovski ............. B25J 15/0061 |
| 2019/0084012 | A1* | 3/2019 | McCoy, Jr. .......... B25J 15/0616 |
| 2019/0263603 | A1 | 8/2019 | Saylor |
| 2020/0269429 | A1 | 8/2020 | Chavez et al. |
| 2020/0376662 | A1 | 12/2020 | Arase et al. |
| 2021/0024298 | A1* | 1/2021 | Doppler ............... B65G 1/1378 |
| 2021/0053216 | A1 | 2/2021 | Diankov et al. |
| 2021/0387333 | A1 | 12/2021 | Diankov et al. |

FOREIGN PATENT DOCUMENTS

| | | |
|---|---|---|
| CN | 103043359 A | 4/2013 |
| CN | 104044151 A | 9/2014 |
| CN | 106660207 A | 5/2017 |
| CN | 106660212 A | 5/2017 |
| CN | 107838945 A | 3/2018 |
| CN | 108778636 A | 11/2018 |
| CN | 109129544 A | 1/2019 |
| CN | 109483554 A | 3/2019 |
| CN | 109500810 A | 3/2019 |
| CN | 112405570 A | 2/2021 |
| JP | 2002254380 A | 9/2002 |
| JP | 2010005769 A | 1/2010 |
| JP | 5015957 A | 6/2012 |
| JP | 2013154457 A | 5/2013 |
| JP | 2014176926 A | 9/2014 |
| JP | 201847515 A | 3/2018 |
| JP | 2019085271 A | 6/2019 |
| JP | 2019162685 A | 9/2019 |
| KR | 20190068663 A | 6/2019 |
| WO | 2017093683 A1 | 6/2017 |
| WO | 2019147697 A1 | 8/2019 |

OTHER PUBLICATIONS

Mueller et al., A new Multi-Modal Approach towards reliable Bin-Picking Application, 2016, IEEE, p. 1-7 (Year: 2016).*
Staretu et al., Complex software for command and control of the anthropomorphic gripper for robots, 2012, IEEE, p. 662-667 (Year: 2012).*
Fajardo et al., Development of a variable negative pressure Jamming Gripper through visual object size classification and Artificial Neural Network, 2016, IEEE, p. 2081-2085 (Year: 2016).*
Lee et al., Bin Picking for the Objects of Non-Lambertian Reflectance without using an Explicit Object Model, 2014, IEEE, p. 489-493 (Year: 2014).*
Zesch et al., Vacuum tool for handling microobjects with a NanoRobot, 1997, IEEE, p. 1761-1766 (Year: 1997).*
Takahashi et al., Octopus bioinspired vacuum gripper with micro bumps, 2016, IEEE, p. 1-4 (Year: 2016).*
Zhakypov et al., An Origami-Inspired Reconfigurable Suction Gripper for Picking Objects With Variable Shape and Size, 2018, IEEE, p. 2894-2901 (Year: 2018).*
Kenos Vacuum Gripping Systems, Piab USA, Inc., Hingham, MA, www.piab.com, brochure downloaded on Nov. 18, 2019, 20 pages.
The ultimate cobot gripper, Kenos KCS Gripper, Piab USA, Inc., Hingham, MA, www.piab.com, brochure downloaded on Nov. 18, 2019, 12 pages.
Notice of Reasons for Rejection for Japanese patent application No. 2020-122816, dated Aug. 19, 2020, Translation and Official, 10 pages.
Decision to Grant for Japanese patent application No. 2020-122816, dated Aug. 19, 2020, 3 pages.
ISA/KR Korean Intellectual Property Office, International Search Report and Written Opinion for PCT/US2020/047226 filed Aug. 20, 2020, dated Dec. 4, 2020, 12 pages.
Non-Final Office Action dated Nov. 18, 2020 for U.S. Appl. No. 16/998,857, filed Aug. 20, 2020, Applicant: MUJIN, Inc., Inventors: Rosen Nikolaev Diankov and Hironori Mizoguchi, 22 pages.
Final Office Action dated Feb. 23, 2021 for U.S. Appl. No. 16/998,857, filed Aug. 20, 2020, Applicant: MUJIN, Inc., Inventors: Rosen Nikolaev Diankov and Hironori Mizoguchi, 25 pages.
CNIPA Office Action dated May 31, 2021 for Chinese patent application No. 20201769547.3, 12 pages.
CNIPA Office Action dated Aug. 18, 2021 for Chinese patent application No. 20201769547.3, 12 pages.
CNIPA Notice to Grant dated Nov. 15, 2021 for Chinese patent application No. 202010769547.3, 4 pages.
Notice of Reasons for Rejection for Japanese patent application No. 2020-569150, dated Aug. 12, 2021, Translation and Official, 6 pages.
JPO Decision to Grant dated Sep. 17, 2021 for Japanese patent application No. 2020-569150, 3 pages.
Notice of Allowance dated May 18, 2021 for U.S. Appl. No. 16/998,857, filed Aug. 20, 2020, Applicant: MUJIN, Inc., Inventors: Rosen Nikolaev Diankov and Hironori Mizoguchi, 5 pages.
Fatikow et al., Microrobot System for Automatic Nanohandling Inside a Scanning Electron Microscope, 2007, IEEE, p. 244-252, Year: 2007.

* cited by examiner

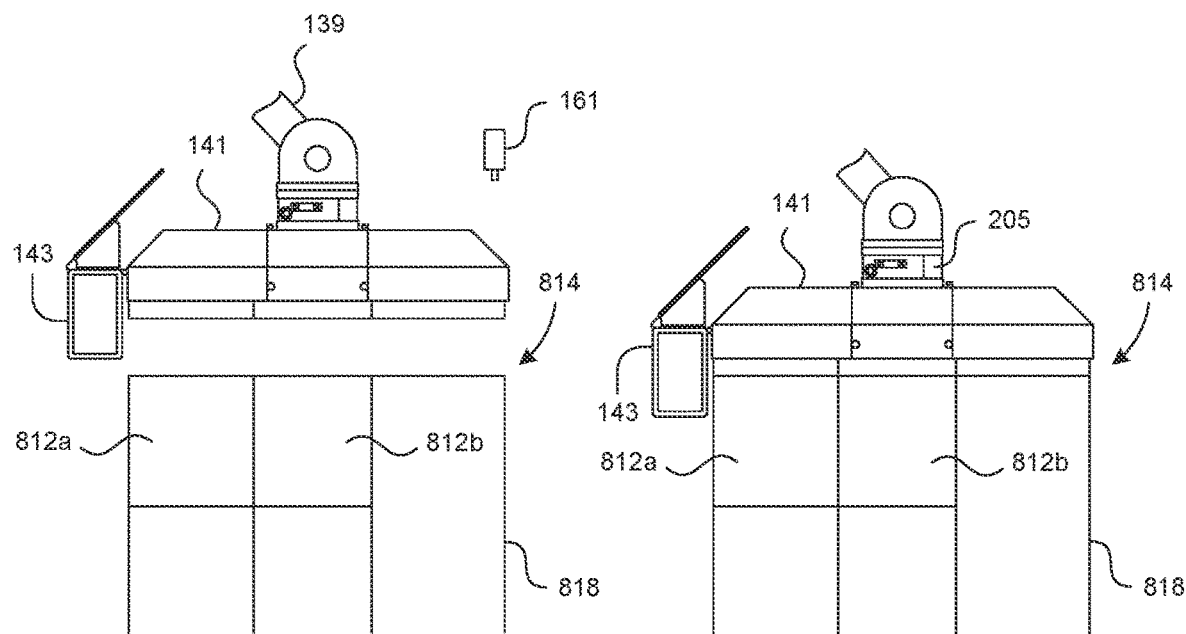
*Fig. 18*  *Fig. 19*
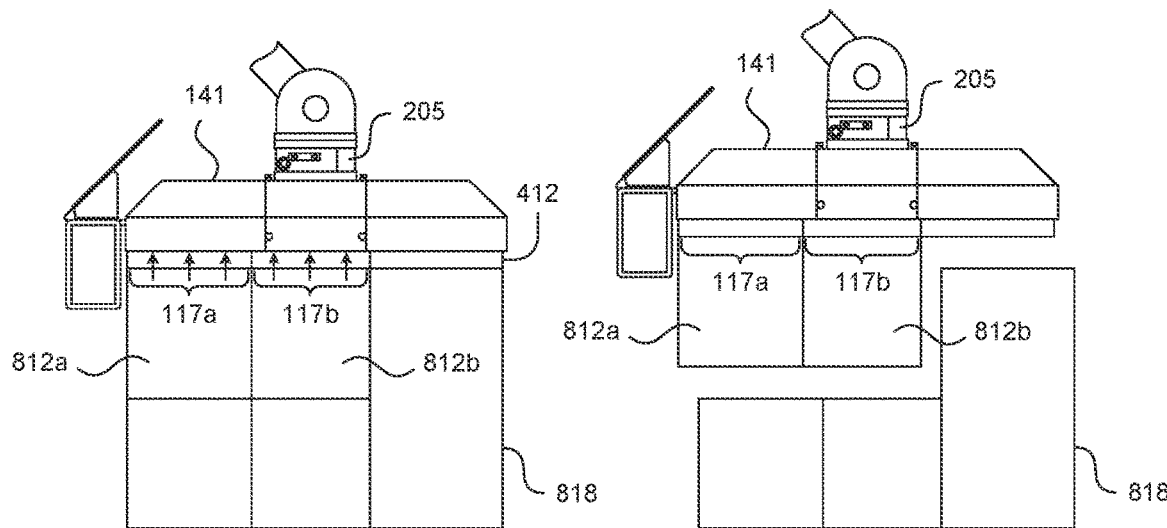
*Fig. 20*  *Fig. 21*

US 11,904,468 B2

ROBOTIC MULTI-GRIPPER ASSEMBLIES AND METHODS FOR GRIPPING AND HOLDING OBJECTS

CROSS-REFERENCE TO RELATED APPLICATIONS

This application is a continuation of U.S. patent application Ser. No. 16/855,751 filed Apr. 22, 2020, now allowed, which claims the benefit of U.S. Provisional Patent Application No. 62/889,562 filed Aug. 21, 2019, both of which are incorporated herein by reference in its entirety.

TECHNICAL FIELD

The present technology is directed generally to robotic systems and, more specifically, robotic multi-grippers assemblies configured to selectively grip and hold objects.

BACKGROUND

Robots (e.g., machines configured to automatically/autonomously execute physical actions) are now extensively used in many fields. Robots, for example, can be used to execute various tasks (e.g., manipulate or transfer an object) in manufacturing, packaging, transport and/or shipping, etc. In executing the tasks, robots can replicate human actions, thereby replacing or reducing human involvements that are otherwise required to perform dangerous or repetitive tasks. Robots often lack the sophistication necessary to duplicate human sensitivity and/or adaptability required for executing more complex tasks. For example, robots often have difficulty selectively gripping object(s) from a group of objects with immediately neighboring objects, as well as irregular shaped/sized objects, etc. Accordingly, there remains a need for improved robotic systems and techniques for controlling and managing various aspects of the robots.

BRIEF DESCRIPTION OF THE DRAWINGS

FIGS. 18-21 illustrate stages of robotically gripping and transporting objects in accordance with one or more embodiments of the present technology.

DETAILED DESCRIPTION

Figure 1:
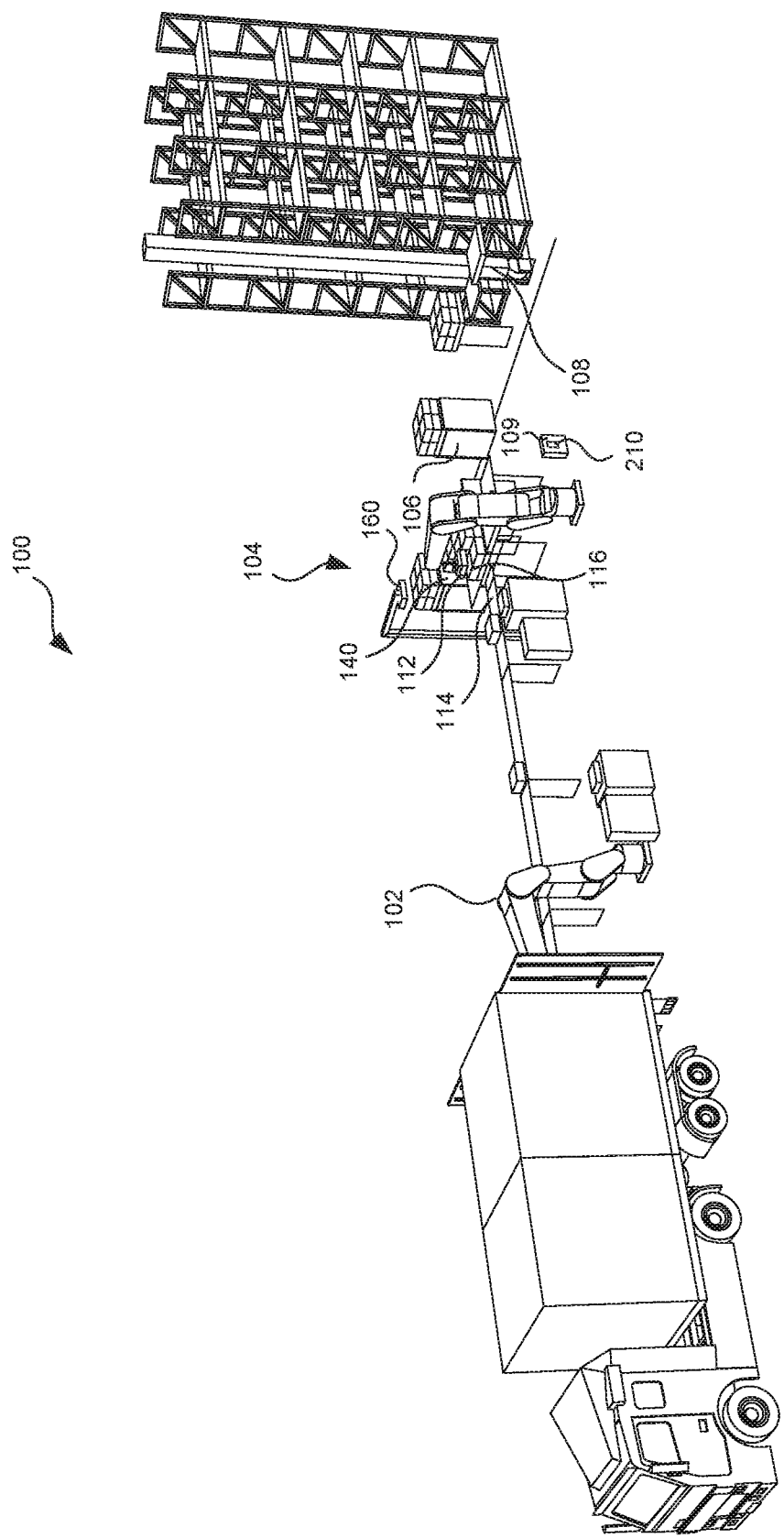
FIG. 1 is an illustration of an example environment in which a robotic system transports objects in accordance with one or more embodiments of the present technology.

Systems and methods for gripping selected objects are described herein. The systems can include a transport robot with multi-gripper assemblies configured to be operated independently or in conjunction to grip/release a single object or a plurality of objects. For example, the systems can pick up multiple objects at the same time or sequentially. The system can select objects to be carried based upon, for example, the carrying capability of the multi-gripper assembly, a transport plan, or combinations thereof. The multi-gripper assembly can reliably grip objects from a group of objects, irregular objects, shaped/sized objects, etc. For example, the multi-gripper assemblies can include addressable vacuum regions or banks each configured to draw in air such that only selected objects are held via a vacuum grip. The multi-gripper assembly can be robotically moved to transport the retained objects to a desired location and can then release the objects. The system can also release gripped objects at the same time or sequentially. This process can be repeated to transport any number of objects between different locations.

At least some embodiments are directed to a method for operating a transport robot having a multi-gripper assembly with addressable pick-up regions. The pick-up regions can be configured to independently provide vacuum gripping. Target object(s) are identified based on captured image data. The pick-up regions can draw in air to grip the identified target object(s). In some embodiments, a transport robot to robotically move the multi-gripper assembly, which is carrying the identified target objects.

In some embodiments, a robotic transport system includes a robotic apparatus, a target object detector, and a vacuum gripper device. The vacuum gripper device includes a plurality of addressable regions and a manifold assembly. The manifold assembly can be fluidically coupled to each of the addressable regions and to at least one vacuum line such that each addressable region is capable of independently providing a negative pressure via an array of suction elements. The negative pressure can be sufficient to hold at least one target object against the vacuum gripper device while the robotic apparatus moves the vacuum gripper device between different locations.

A method for operating a transport robot includes receiving image data representative of a group of objects (e.g., a stack or pile of objects). One or more target objects are identified in the group based on the received image data. Addressable vacuum regions are selected based on the identified one or more target objects. The transport robot is command to cause the selected vacuum regions to hold and transport the identified one or more target objects. The transport robot includes a multi-gripper assembly having an array of vacuum regions each configured to independently provide vacuum gripping. A vision sensor device can capture the image data, which is representative of the target objects adjacent to or held by the vacuum gripper device In the following, numerous specific details are set forth to provide a thorough understanding of the presently disclosed technology. In other embodiments, the techniques introduced here can be practiced without these specific details. In other instances, well-known features, such as specific functions or routines, are not described in detail in order to avoid unnecessarily obscuring the present disclosure. References in this description to "an embodiment," "one embodiment," or the like mean that a particular feature, structure, material, or characteristic being described is included in at least one embodiment of the present disclosure. Thus, the appearances of such phrases in this specification do not necessarily all refer to the same embodiment. On the other hand, such references are not necessarily mutually exclusive either. Furthermore, the particular features, structures, materials, or characteristics can be combined in any suitable manner in one or more embodiments. It is to be understood that the various embodiments shown in the figures are merely illustrative representations and are not necessarily drawn to scale.

Several details describing structures or processes that are well-known and often associated with robotic systems and subsystems, but that can unnecessarily obscure some significant aspects of the disclosed techniques, are not set forth in the following description for purposes of clarity. Moreover, although the following disclosure sets forth several embodiments of different aspects of the present technology, several other embodiments can have different configurations or different components than those described in this section. Accordingly, the disclosed techniques can have other embodiments with additional elements or without several of the elements described below.

Many embodiments or aspects of the present disclosure described below can take the form of computer- or controller-executable instructions, including routines executed by a programmable computer or controller. Those skilled in the relevant art will appreciate that the disclosed techniques can be practiced on computer or controller systems other than those shown and described below. The techniques described herein can be embodied in a special-purpose computer or data processor that is specifically programmed, configured, or constructed to execute one or more of the computer-executable instructions described below. Accordingly, the terms "computer" and "controller" as generally used herein refer to any data processor and can include Internet appliances and handheld devices (including palm-top computers, wearable computers, cellular or mobile phones, multi-processor systems, processor-based or programmable consumer electronics, network computers, mini computers, and the like). Information handled by these computers and controllers can be presented at any suitable display medium, including a liquid crystal display (LCD). Instructions for executing computer- or controller-executable tasks can be stored in or on any suitable computer-readable medium, including hardware, firmware, or a combination of hardware and firmware. Instructions can be contained in any suitable memory device, including, for example, a flash drive, USB device, and/or other suitable medium, including a tangible, non-transient computer-readable medium.

The terms "coupled" and "connected," along with their derivatives, can be used herein to describe structural relationships between components. It should be understood that these terms are not intended as synonyms for each other. Rather, in particular embodiments, "connected" can be used to indicate that two or more elements are in direct contact with each other. Unless otherwise made apparent in the context, the term "coupled" can be used to indicate that two or more elements are in either direct or indirect (with other intervening elements between them) contact with each other, or that the two or more elements co-operate or interact with each other (e.g., as in a cause-and-effect relationship, such as for signal transmission/reception or for function calls), or both.

Suitable Environments

FIG. 1 is an illustration of an example environment in which a robotic system 100 transports objects. The robotic system 100 can include an unloading unit 102, a transfer unit or assembly 104 ("transfer assembly 104"), a transport unit 106, a loading unit 108, or a combination thereof in a warehouse or a distribution/shipping hub. Each of the units of the robotic system 100 can be configured to execute one or more tasks. The tasks can be combined in sequence to perform an operation that achieves a goal, such as to unload objects from a truck or a van for storage in a warehouse or to unload objects from storage locations and load them onto a truck or a van for shipping. In another example, the task can include moving objects from one container to another container. Each of the units can be configured to execute a sequence of actions (e.g., operating one or more components therein) to execute a task.

In some embodiments, the task can include manipulation (e.g., moving and/or reorienting) of a target object or package 112 (e.g., boxes, cases, cages, pallets, etc.) from a start location 114 to a task location 116. For example, the unloading unit 102 (e.g., a devanning robot) can be configured to transfer the target package 112 from a location in a carrier (e.g., a truck) to a location on a conveyor belt. The transfer assembly 104 (e.g., a palletizing robot assembly) can be configured to load packages 112 onto the transport unit 106 or conveyor 120. In another example, the transfer assembly 104 can be configured to transfer one or more target packages 112 from one container to another container. The transfer assembly 104 can include a robotic end effector 140 ("end effector 140") with vacuum grippers (or vacuum regions) each individually operated to pick up and carry object(s) 112. When the end effector 140 is placed adjacent an object, air can be into the gripper(s) adjacent to target packages 112, thereby creating a pressure differential sufficient for retaining the target objects. The target objects can be picked up and transported without damaging or marring the object surfaces. The number of packages 112 carried at one time can be selected based upon stacking arrangements of objects at the pick-up location, available space at the drop off location, transport paths between pick-up and drop off locations, optimization routines (e.g., routines for optimizing unit usage, robotic usage, etc.), combinations thereof, or the like. The end effector 140 can have one or more sensors configured to output readings indicating information about retained objects (e.g., number and configurations of retained objects), relative positions between any retained objects, or the like.

An imaging system 160 can provide image data used to monitor operation of components, identify target objects, track objects, or otherwise perform tasks. The image data can be analyzed to evaluate, for example, package stacking arrangements (e.g., stacked packages, such as cardboard boxes, packing containers, etc.), positional information of objects, available transport paths (e.g., transport paths between pickup zones and drop off zones), positional information about gripping assemblies, or combinations thereof. A controller 109 can communicate with the imaging system 160 and other components of the robotic system 100. The controller 109 can generate transport plans that include a sequence for picking up and dropping off objects (e.g., illustrated as stable containers), positioning information, order information for picking up objects, order information for dropping off objects, stacking plans (e.g., plans for stacking objects at the drop off zone), re-stacking plans (e.g., plans for re-stacking at least some of the containers at the pickup zone), or combinations thereof. The information and instructions provided by transport plans can be selected based on the arrangement of the containers, the contents of the containers, or combinations thereof. In some embodiments, the controller 109 can include electronic/electrical devices, such as one or more processing units, processors, storage devices (e.g., external or internal storage devices, memory, etc.), communication devices (e.g., communication devices for wireless or wired connections), and input-output devices (e.g., screens, touchscreen displays, keyboards, keypads, etc.). Example electronic/electrical devices and controller components are discussed in connection with FIGS. 2 and 6.

The transport unit 106 can transfer the target package 112 (or multiple target packages 112) from an area associated with the transfer assembly 104 to an area associated with the loading unit 108, and the loading unit 108 can transfer the target package 112 (by, e.g., moving the pallet carrying the target package 112) to a storage location. In some embodiments, the controller 109 can coordinate operation of the transfer assembly 104 and the transport unit 106 to efficiently load objects onto storage shelves.

The robotic system 100 can include other units, such as manipulators, service robots, modular robots, etc., not shown in FIG. 1. For example, in some embodiments, the robotic system 100 can include a de-palletizing unit for transferring the objects from cage carts or pallets onto conveyors or other pallets, a container-switching unit for transferring the objects from one container to another, a packaging unit for wrapping the objects, a sorting unit for grouping objects according to one or more characteristics thereof, a piece-picking unit for manipulating (e.g., for sorting, grouping, and/or transferring) the objects differently according to one or more characteristics thereof, or a combination thereof. Components and subsystems of the system 100 can include different types of and effectors. For example, unloading unit 102, transport unit 106, loading unit 108, and other components of the robotic system 100 can also include robotic multi-gripper assemblies. The configurations of the robotic gripper assemblies can be selected based on desired carrying capabilities. For illustrative purposes, the robotic system 100 is described in the context of a shipping center; however, it is understood that the robotic system 100 can be configured to execute tasks in other environments/purposes, such as for manufacturing, assembly, packaging, healthcare, and/or other types of automation. Details regarding the task and the associated actions are described below.

Robotic Systems

Figure 2:
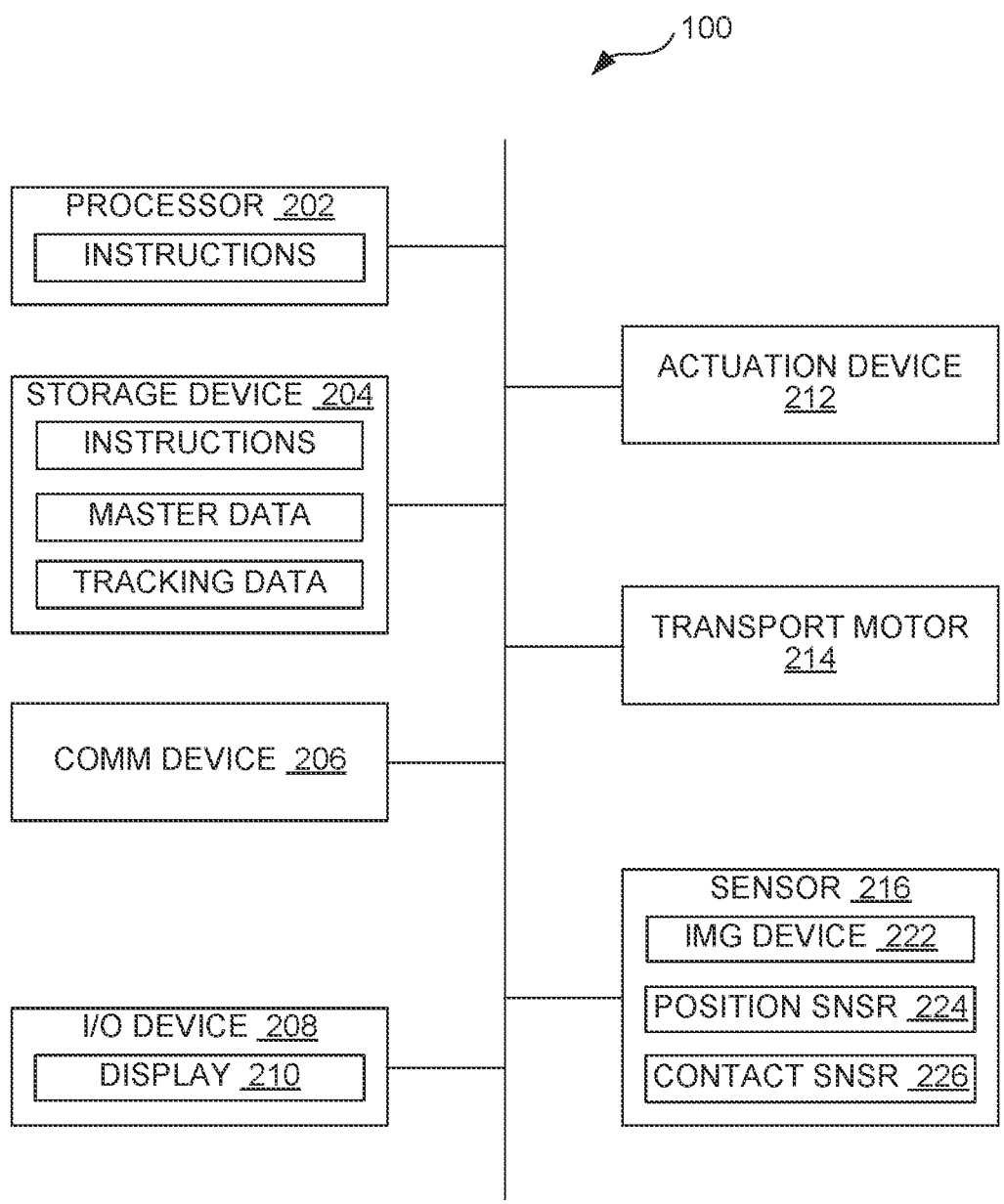
FIG. 2 is a block diagram illustrating the robotic system in accordance with one or more embodiments of the present technology.

FIG. 2 is a block diagram illustrating components of the robotic system 100 in accordance with one or more embodiments of the present technology. In some embodiments, for example, the robotic system 100 (e.g., at one or more of the units or assemblies and/or robots described above) can include electronic/electrical devices, such as one or more processors 202, one or more storage devices 204, one or more communication devices 206, one or more input-output devices 208, one or more actuation devices 212, one or more transport motors 214, one or more sensors 216, or a combination thereof. The various devices can be coupled to each other via wire connections and/or wireless connections. For example, the robotic system 100 can include a bus, such as a system bus, a Peripheral Component Interconnect (PCI) bus or PCI-Express bus, a HyperTransport or industry standard architecture (ISA) bus, a small computer system interface (SCSI) bus, a universal serial bus (USB), an IIC (I2C) bus, or an Institute of Electrical and Electronics Engineers (IEEE) standard 1394 bus (also referred to as "Firewire"). Also, for example, the robotic system 100 can include bridges, adapters, controllers, or other signal-related devices for providing the wire connections between the devices. The wireless connections can be based on, for example, cellular communication protocols (e.g., 3G, 4G, LTE, 5G, etc.), wireless local area network (LAN) protocols (e.g., wireless fidelity (WIFI)), peer-to-peer or device-to-device communication protocols (e.g., Bluetooth, Near-Field communication (NFC), etc.), Internet of Things (IoT) protocols (e.g., NB-IoT, Zigbee, Z-wave, LTE-M, etc.), and/or other wireless communication protocols.

The processors 202 can include data processors (e.g., central processing units (CPUs), special-purpose computers, and/or onboard servers) configured to execute instructions (e.g., software instructions) stored on the storage devices 204 (e.g., computer memory). The processors 202 can implement the program instructions to control/interface with other devices, thereby causing the robotic system 100 to execute actions, tasks, and/or operations.

The storage devices 204 can include non-transitory computer-readable mediums having stored thereon program instructions (e.g., software). Some examples of the storage devices 204 can include volatile memory (e.g., cache and/or random-access memory (RAM) and/or non-volatile memory (e.g., flash memory and/or magnetic disk drives). Other examples of the storage devices 204 can include portable memory drives and/or cloud storage devices.

In some embodiments, the storage devices 204 can be used to further store and provide access to master data, processing results, and/or predetermined data/thresholds. For example, the storage devices 204 can store master data that includes descriptions of objects (e.g., boxes, cases, containers, and/or products) that may be manipulated by the robotic system 100. In one or more embodiments, the master data can include a dimension, a shape (e.g., templates for potential poses and/or computer-generated models for recognizing the object in different poses), mass/weight information, a color scheme, an image, identification information (e.g., bar codes, quick response (QR) codes, logos, etc., and/or expected locations thereof), an expected mass or weight, or a combination thereof for the objects expected to be manipulated by the robotic system 100. In some embodiments, the master data can include manipulation-related information regarding the objects, such as a center-of-mass location on each of the objects, expected sensor measurements (e.g., force, torque, pressure, and/or contact measurements) corresponding to one or more actions/maneuvers, or a combination thereof. The robotic system can look up pressure levels (e.g., vacuum levels, suction levels, etc.), gripping/pickup areas (e.g., areas or banks of vacuum grippers to be activated), and other stored master data for controlling transfer robots. The storage devices 204 can also store object tracking data. In some embodiments, the object tracking data can include a log of scanned or manipulated objects. In some embodiments, the object tracking data can include image data (e.g., a picture, point cloud, live video feed, etc.) of the objects at one or more locations (e.g., designated pickup or drop locations and/or conveyor belts). In some embodiments, the object tracking data can include locations and/or orientations of the objects at the one or more locations.

The communication devices 206 can include circuits configured to communicate with external or remote devices via a network. For example, the communication devices 206 can include receivers, transmitters, modulators/demodulators (modems), signal detectors, signal encoders/decoders, connector ports, network cards, etc. The communication devices 206 can be configured to send, receive, and/or process electrical signals according to one or more communication protocols (e.g., the Internet Protocol (IP), wireless communication protocols, etc.). In some embodiments, the robotic system 100 can use the communication devices 206 to exchange information between units of the robotic system 100 and/or exchange information (e.g., for reporting, data gathering, analyzing, and/or troubleshooting purposes) with systems or devices external to the robotic system 100.

The input-output devices 208 can include user interface devices configured to communicate information to and/or receive information from human operators. For example, the input-output devices 208 can include a display 210 and/or other output devices (e.g., a speaker, a haptics circuit, or a tactile feedback device, etc.) for communicating information to the human operator. Also, the input-output devices 208 can include control or receiving devices, such as a keyboard, a mouse, a touchscreen, a microphone, a user interface (UI) sensor (e.g., a camera for receiving motion commands), a wearable input device, etc. In some embodiments, the robotic system 100 can use the input-output devices 208 to interact with the human operators in executing an action, a task, an operation, or a combination thereof.

In some embodiments, a controller (e.g., controller 109 of FIG. 1) can include the processors 202, storage devices 204, communication devices 206, and/or input-output devices 208. The controller can be a standalone component or part of a unit/assembly. For example, each unloading unit, a transfer assembly, a transport unit, and a loading unit of the system 100 can include one or more controllers. In some embodiments, a single controller can control multiple units or standalone components.

The robotic system 100 can include physical or structural members (e.g., robotic manipulator arms) connected at joints for motion (e.g., rotational and/or translational displacements). The structural members and the joints can form a kinetic chain configured to manipulate an end-effector (e.g., the gripper) configured to execute one or more tasks (e.g., gripping, spinning, welding, etc.) depending on the use/operation of the robotic system 100. The robotic system 100 can include the actuation devices 212 (e.g., motors, actuators, wires, artificial muscles, electroactive polymers, etc.) configured to drive or manipulate (e.g., displace and/or reorient) the structural members about or at a corresponding joint. In some embodiments, the robotic system 100 can include the transport motors 214 configured to transport the corresponding units/chassis from place to place. For example, the actuation devices 212 and transport motors connected to or part of a robotic arm, a linear slide, or other robotic component.

The sensors 216 can be configured to obtain information used to implement the tasks, such as for manipulating the structural members and/or for transporting the robotic units. The sensors 216 can include devices configured to detect or measure one or more physical properties of the robotic system 100 (e.g., a state, a condition, and/or a location of one or more structural members/joints thereof) and/or for a surrounding environment. Some examples of the sensors 216 can include contact sensors, proximity sensors, accelerometers, gyroscopes, force sensors, strain gauges, torque sensors, position encoders, pressure sensors, vacuum sensors, etc.

In some embodiments, for example, the sensors 216 can include one or more imaging devices 222 (e.g., 2-dimensional and/or 3-dimensional imaging devices). configured to detect the surrounding environment. The imaging devices can include cameras (including visual and/or infrared cameras), lidar devices, radar devices, and/or other distance-measuring or detecting devices. The imaging devices 222 can generate a representation of the detected environment, such as a digital image and/or a point cloud, used for implementing machine/computer vision (e.g., for automatic inspection, robot guidance, or other robotic applications).

Referring now to FIGS. 1 and 2, the robotic system 100 (via, e.g., the processors 202) can process image data and/or the point cloud to identify the target package 112 of FIG. 1, the start location 114 of FIG. 1, the task location 116 of FIG. 1, a pose of the target package 112 of FIG. 1, or a combination thereof. The robotic system 100 can use image data to determine how to access and pick up objects. Images of the objects can be analyzed to determine a pickup plan for positioning a vacuum gripper assembly to grip targeted objects even though adjacent objects may also be proximate to the gripper assembly. Imaging output from onboard sensors 216 (e.g., lidar devices) and image data from remote devices (e.g., the imaging system 160 of FIG. 1) can be utilized alone or in combination. The robotic system 100 (e.g., via the various units) can capture and analyze an image of a designated area (e.g., inside the truck, inside the container, or a pickup location for objects on the conveyor belt) to identify the target package 112 and the start location 114 thereof. Similarly, the robotic system 100 can capture and analyze an image of another designated area (e.g., a drop location for placing objects on the conveyor belt, a location for placing objects inside the container, or a location on the pallet for stacking purposes) to identify the task location 116.

Also, for example, the sensors 216 of FIG. 2 can include position sensors 224 FIG. 2 (e.g., position encoders, potentiometers, etc.) configured to detect positions of structural members (e.g., the robotic arms and/or the end-effectors) and/or corresponding joints of the robotic system 100. The robotic system 100 can use the position sensors 224 to track locations and/or orientations of the structural members and/or the joints during execution of the task. The unloading unit, transfer unit, transport unit/assembly, and the loading unit disclosed herein can include the sensors 216.

In some embodiments, the sensors 216 can include contact sensors 226 (e.g., force sensors, strain gauges, piezoresistive/piezoelectric sensors, capacitive sensors, elastoresistive sensors, and/or other tactile sensors) configured to measure a characteristic associated with a direct contact between multiple physical structures or surfaces. The contact sensors 226 can measure the characteristic that corresponds to a grip of the end-effector (e.g., the gripper) on the target package 112. Accordingly, the contact sensors 226 can output a contact measurement that represents a quantified measurement (e.g., a measured force, torque, position, etc.) corresponding to physical contact, a degree of contact or attachment between the gripper and the target package 112, or other contact characteristics. For example, the contact measurement can include one or more force, pressure, or torque readings associated with forces associated with gripping the target package 112 by the end-effector. In some embodiments, the contact measurement can include both (1) pressure readings associated with vacuum gripping and (2) force readings (e.g., moment readings) associated with carrying object(s). Details regarding the contact measurements are described below.

As described in further detail below, the robotic system 100 (via, e.g., the processors 202) can implement different actions to accomplish tasks based on the contact measurement, image data, combinations thereof, etc. For example, the robotic system 100 can regrip the target package 112 if the initial contact measurement is below a threshold, such as the vacuum grip is low (e.g., a suction level is below a vacuum threshold), or combinations thereof. Also, the robotic system 100 can intentionally drop the target package 112, adjust the task location 116, adjust a speed or an acceleration for the action, or a combination thereof based on one or more transport rules (e.g., if the contact measure or suction level falls below a threshold during execution of the task) and the contact measurements, image data, and/or other readings or data.

Robotic Transfer Assembly

Figure 3:
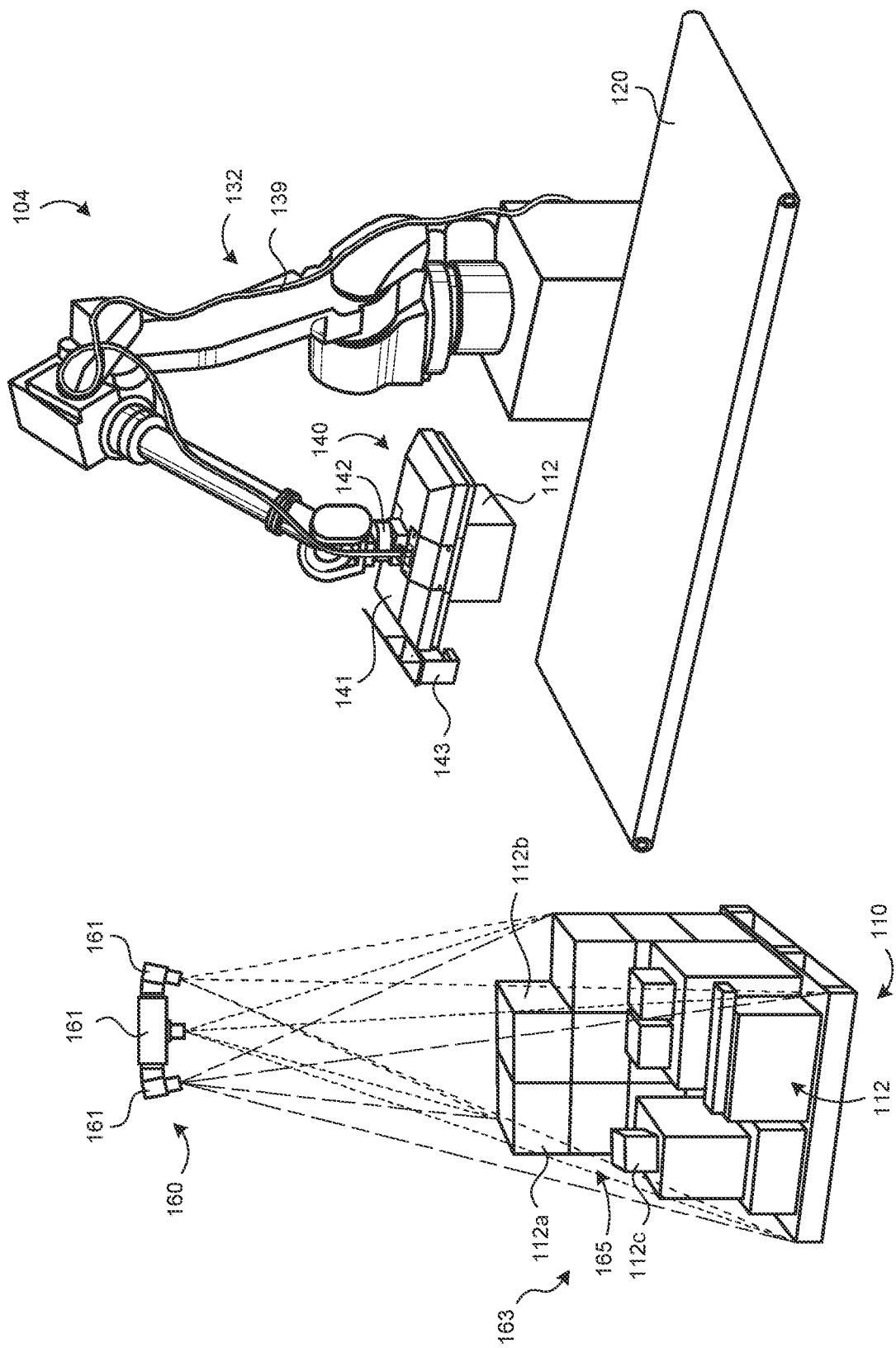
FIG. 3 illustrates a multi-component transfer assembly in accordance with one or more embodiments of the present technology.

FIG. 3 illustrates the transfer assembly 104 in accordance with one or more embodiments of the present technology. The transfer assembly 104 can include the imaging system 160 and a robotic arm system 132. The imaging system 160 can provide image data captured from a target environment with a de-palletizing platform 110. The robotic arm system 132 can include a robotic arm assembly 139 and an end effector 140, which includes a vision sensor device 143 and a multi-gripper assembly 141 ("gripper assembly 141"). The robotic arm assembly 139 can position the end effector 140 above a group of objects in a stack 165 located at a pickup environment 163. The vision sensor device 143 can detect nearby objects without contacting, moving, or dislodging objects in the stack 165.

Target objects can be secured against the bottom of the end effector 140. In some embodiments, the gripper assembly 141 can have addressable regions each selectively capable of drawing in air for providing a vacuum grip. In some modes of operation, only addressable regions proximate to the targeted object(s) draw in air to provide a pressure differential directly between the vacuum gripper device and the targeted object(s). This allows only selected packages (i.e., targeted packages) to be pulled or otherwise secured against the gripper assembly 141 even though other gripping portions of the gripper assembly 141 are adjacent to or contact other packages.

FIG. 3 shows the gripper assembly 141 carrying a single object or package 112 ("package 112") positioned above a conveyer 120. The gripper assembly 141 can release the package 112 onto a conveyor belt 120, and the robotic arm system 132 can then retrieve the packages 112a, 112b by positioning the unloaded gripper assembly 141 directly above both packages 112a, 112b. The gripper assembly 141 can then hold, via a vacuum grip, both packages 112a, 112b, and the robotic arm system 132 can carry the retained packages 112a, 112b to a position directly above the conveyor 120. The gripper assembly 141 can then release (e.g., simultaneous or sequentially) the packages 112a, 112b onto the conveyor 120. This process can be repeated any number of times to carry the objects from the stack 165 to the conveyor 120.

The vision sensor device 143 can include one or more optical sensors configured to detect packages held underneath the gripper assembly 141. The vision sensor device 143 can be positioned to the side of the gripper assembly 141 to avoid interference with package pick up/drop off. In some embodiments, the vision sensor device 143 is movably coupled to the end effector 140 or robotic arm 139 such that the vision sensor device 143 can be moved to different sides of the gripper assembly 141 to avoid striking objects while detecting a presence of one or more objects, if any, held by the gripper assembly 141. The position, number, and configurations of the vision sensor devices 143 can be selected based on the configuration of the gripper assembly 141.

With continued reference to FIG. 3, the de-palletizing platform 110 can include any platform, surface, and/or structure upon which a plurality of objects or packages 112 (singularly, "package 112") may be stacked and/or staged and ready to be transported. The imaging system 160 can include one or more imaging devices 161 configured to capture image data of the packages 112 on the de-palletizing platform 110. The imaging devices 161 can capture distance data, position data, video, still images, lidar data, radar data and/or motion at the pickup environment or region 163. It should be noted that, although the terms "object" and "package" are used herein, the terms include any other items capable of being gripped, lifted, transported, and delivered such as, but not limited to, "case," "box", "carton," or any combination thereof. Moreover, although polygonal boxes (e.g., rectangular boxes) are illustrated in the drawings disclosed herein, the shapes of the boxes are not limited to such shape but includes any regular or irregular shape that, as discussed in detail below, is capable of being gripped, lifted, transported, and delivered.

Like the de-palletizing platform 110, the receiving conveyor 120 can include any platform, surface, and/or structure designated to receive the packages 112 for further tasks/operations. In some embodiments, the receiving conveyor 120 can include a conveyor system for transporting the package 112 from one location (e.g., a release point) to another location for further operations (e.g., sorting and/or storage).

Figure 4:
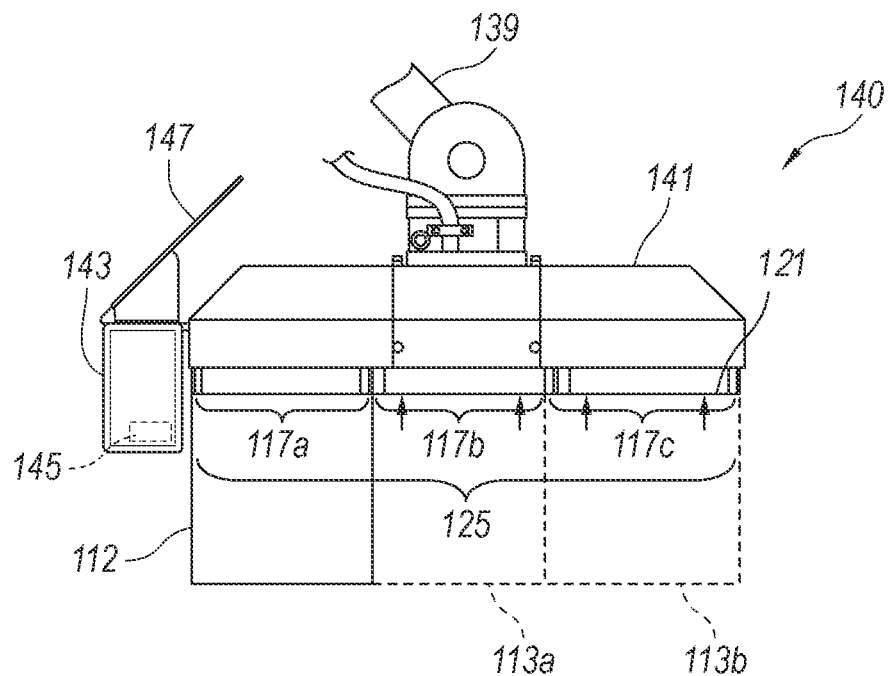
FIG. 4 is a front view of an end effector coupled to a robotic arm of a transport robot in accordance with one or more embodiments of the present technology.
Figure 5:
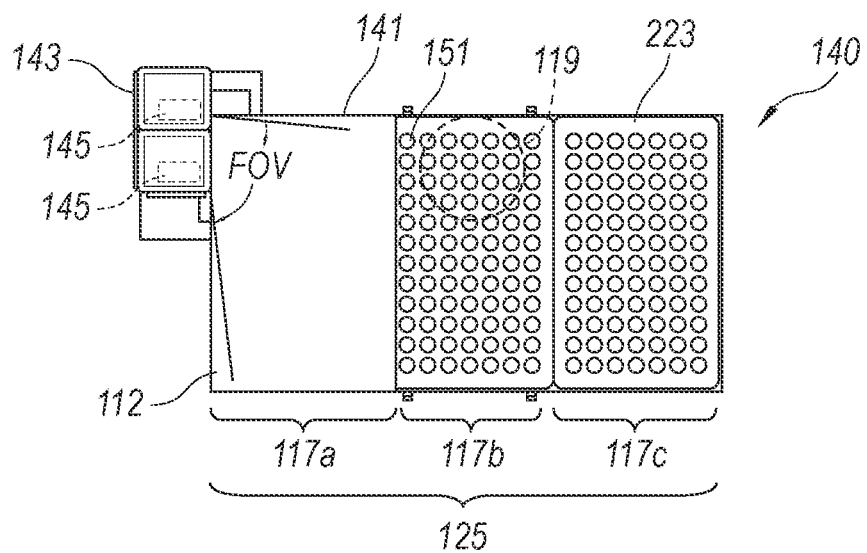
FIG. 5 is a bottom view of the end effector of FIG. 4.

FIG. 4 is a front view of the end effector 140 coupled to the robotic arm 139 in accordance with some embodiments of the present technology. FIG. 5 is a bottom view of the end effector 140 of FIG. 4. The vision sensor device 143 can include one or more sensors 145 configured to detect packages and a calibration board 147 used to, for example, calibrate the position of the gripper assembly 141 relative to the vision sensor device 143. In some embodiments, the calibration board 147 can be a placard with a pattern or design used for calibrating or defining the position of the end effector 140 or gripper assembly 141 within the operating environment, position of the robotic arm 139, or a combination thereof. The gripper assembly 141 can include addressable vacuum zones or regions 117a, 117b, 117c (collectively "vacuum regions 117") defining a gripping zone 125. The description of one vacuum region 117 applies to the other vacuum regions 117 unless indicated otherwise. In some embodiments, each vacuum region 117 can be a suction channel bank that includes components connected to a vacuum source external to the end effector 140. The vacuum regions 117 can include gripping interfaces 121 (one identified in FIG. 4) against which objects can be held.

Referring now to FIG. 4, the vacuum region 117a can draw in air to hold the package 112 and can reduce or stop drawing in air to release the package 112. The vacuum regions 117b, 117c (illustrated not holding packages) can independently draw in air (indicated by arrows) to hold packages at corresponding positions 113a, 113b (illustrated in phantom line in FIG. 4). Referring now to FIG. 5, the vacuum regions 117 can include a group or bank of suction elements 151 (one identified in FIG. 5) through which air is drawn. The suction elements 151 can be evenly/uniformly or unevenly spaced apart from one another and can be arranged in a desired pattern (e.g., an irregular or regular pattern). The vacuum regions 117 can have the same or different number, configurations, and/or pattern of suction elements 151. To carry a package that matches the geometry of the vacuum region 117, air can be drawn through each suction element 151 of the vacuum region 117. To carry smaller packages, air can be drawn through a subset of the suction elements 151 matching the geometry of the package (e.g., suction elements 151 positioned within the boundary or perimeter of the package). For example, air can be drawn through a subset of the suction elements for one of the vacuum region 117, such as only the suction elements 151 immediately adjacent to or overlying a target surface to be gripped. As shown in FIG. 5, for example, the suction elements 151 within a boundary 119 (illustrated in dashed line) can be used to grip a corresponding circular surface of a package.

When all of the vacuum regions 117 are active, the end effector 140 can provide a generally uniform gripping force along the each of the gripping interfaces 121 or entire bottom surface 223. In some embodiments, the bottom surface 223 is a generally continuous and substantially uninterrupted surface and the distance or pitch between suction elements 151 of adjacent vacuum regions 117 can be less than, equal to, or greater than (e.g., 2×, 3×, 4×, etc.) the pitch between suction elements 151 of the same vacuum region 117. The end effector 140 can be configured to hold or affix object(s) via attractive forces, such as achieved by forming and maintaining a vacuum condition between the vacuum regions 117 and the object. For example, the end effector 140 can include one or more vacuum regions 117 configured to contact a surface of the target object and form/retain the vacuum condition in the spaces between the vacuum regions 117 and the surface. The vacuum condition can be created when the end effector 140 is lowered via the robotic arm 139, thereby pressing the vacuum regions 117 against the surface of the target object and pushing out or otherwise removing gases between the opposing surfaces. When the robotic arm 139 lifts the end effector 140, a difference in pressure between the spaces inside the vacuum regions 117 and the surrounding environment can keep the target object attached to the vacuum regions 117. In some embodiments, the air-flow rate through the vacuum regions 117 of the end effector 140 can be dynamically adjusted or based on the contact area between the target object and a contact or gripping surface of the vacuum regions 117 to ensure that a sufficient grip is achieved to securely grip the target object. Similarly, the air-flow rate thought the vacuum regions 117 can be adjusted dynamically to accommodate the weight of the target object, such as increasing the air flow for heavier objects, to ensure that sufficient grip is achieved to securely grip the target object. Example suction elements are discussed in connection with FIG. 15.

Figure 6:
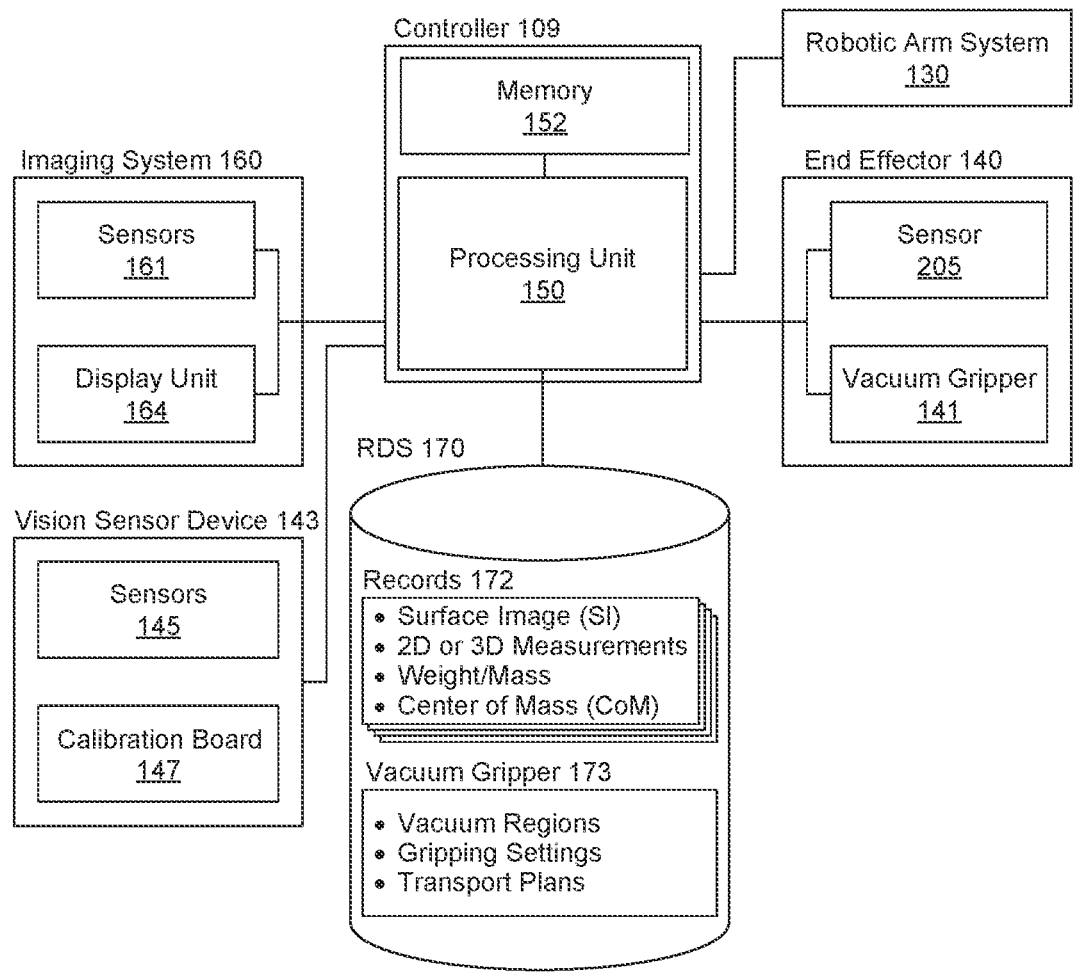
FIG. 6 is a functional block diagram of a robotic transfer assembly in accordance with one or more embodiments of the present technology.

FIG. 6 is a functional block diagram of the transfer assembly 104 in accordance with one or more embodiments of the present technology. A processing unit 150 (PU) can control the movements and/or other actions of the robotic arm system 132. The PU 150 can receive image data from sensors (e.g., sensors 161 of the imaging system 160 of FIG. 3), sensors 145 of the vision sensor device 143, or other sensors or detectors capable of collecting image data, including video, still images, lidar data, radar data, or combinations thereof. In some embodiments, the image data can be indicative or representative of a surface image (SI) of the package 112.

The PU 150 can include any electronic data processing unit which executes software or computer instruction code that could be stored, permanently or temporarily, in memory 152, a digital memory storage device or a non-transitory computer-readable media including, but not limited to, random access memory (RAM), disc drives, magnetic memory, read-only memory (ROM), compact disc (CD), solid-state memory, secure digital cards, and/or compact flash cards. The PU 150 may be driven by the execution of software or computer instruction code containing algorithms developed for the specific functions embodied herein. In some embodiments, the PU 150 may be an application-specific integrated circuit (ASIC) customized for the embodiments disclosed herein. In some embodiments, the PU 150 can include one or more of microprocessors, Digital Signal Processors (DSPs), Programmable Logic Devices (PLDs), Programmable Gate Arrays (PGAs), and signal generators; however, for the embodiments herein, the term "processor" is not limited to such example processing units and its meaning is not intended to be construed narrowly. For instance, the PU 150 can also include more than one electronic data processing unit. In some embodiments, the PU 150 could be a processor(s) used by or in conjunction with any other system of the robotic system 100 including, but not limited to, the robotic arm system 130, the end effector 140, and/or the imaging system 160. The PU 150 of FIG. 6 and the processor 202 of FIG. 2 can be the same component or different components.

The PU 150 may be electronically coupled (via, e.g., wires, buses, and/or wireless connections) to systems and/or sources to facilitate the receipt of input data. In some embodiments, operatively coupled may be considered as interchangeable with electronically coupled. It is not necessary that a direct connection be made; instead, such receipt of input data and the providing of output data could be provided through a bus, through a wireless network, or as a signal received and/or transmitted by the PU 150 via a physical or a virtual computer port. The PU 150 may be programmed or configured to execute the methods discussed herein. In some embodiments, the PU 150 may be programmed or configured to receive data from various systems and/or units including, but not limited to, the imaging system 160, end effector 140, etc. In some embodiments, the PU 150 may be programmed or configured to provide output data to various systems and/or units.

The imaging system 160 could include one or more sensors 161 configured to capture image data representative of the packages (e.g., packages 112 located on the de-palletizing platform 110 of FIG. 3). In some embodiments, the image data can represent visual designs and/or markings appearing on one or more surfaces of the from which a determination of a registration status of the package may be made. In some embodiments, the sensors 161 are cameras configured to work within a targeted (e.g., visible and/or infrared) electromagnetic spectrum bandwidth and used to detect light/energy within the corresponding spectrum. In some camera embodiments, the image data is a set of data points forming point cloud, the depth map, or a combination thereof captured from one or more three-dimensional (3-D)

cameras and/or one or more two-dimensional (2-D) cameras. From these cameras, distances or depths between the imaging system 160 and one or more exposed (e.g., relative to a line of sight for the imaging system 160) surfaces of the packages 112 may be determined. In some embodiments, the distances or depths can be determined by using an image recognition algorithm(s), such as contextual image classification algorithm(s) and/or edge detection algorithm(s). Once determined, the distance/depth values may be used to manipulate the packages via the robotic arm system. For example, the PU 150 and/or the robotic arm system can use the distance/depth values for calculating the position from where the package may be lifted and/or gripped. It should be noted that data described herein, such as the image data, can include any analog or digital signal, either discrete or continuous, which could contain information or be indicative of information.

The imaging system 160 can include at least one display unit 164 configured to present operational information (e.g., status information, settings, etc.), an image of the package(s) 112 captured by the sensors 162, or other information/output that may be viewed by one or more operators of the robotic system 100 as discussed in detail below. In addition, the display units 164 can be configured to present other information such as, but not limited to, symbology representative of targeted packages, non-targeted packages, registered packages, and/or unregistered instances of the packages.

The vision sensor device 143 can communicate with the PU 150 via wire and/or wireless connections. The vision sensor 145 can be video sensors, CCD sensors, lidar sensors, radar sensors, distance-measuring or detecting devices, or the like. Output from the vision sensor device 143 can be used to generate a representation of the package(s), such as a digital image and/or a point cloud, used for implementing machine/computer vision (e.g., for automatic inspection, robot guidance, or other robotic applications). The field of view (e.g., 30 degrees, 90 degrees, 120 degrees, 150 degrees, 180 degrees, 210 degrees, 270 degrees of horizontal and/or vertical FOV) and the range capability of the vision sensor device 143 can be selected based on the configuration the gripper assembly 141. (FIG. 4 shows an exemplary horizontal FOV of about 90 degrees.) In some embodiments, the vision sensors 145 are lidar sensors with one or more light sources (e.g., lasers, infrared lasers, etc.) and optical detectors. The optical detectors can detect light emitted by the light sources and reflected by surfaces of packages. The presence and/or distance to packages can be determined based on the detected light. In some embodiments, the sensors 145 can scan an area, such as substantially all of a vacuum gripping zone (e.g., vacuum gripping zone 125 of FIG. 4). For example, the sensors 154 can include one or more deflectors that move to deflect emitted light across a detection zone. In some embodiments, the sensors 154 are scanning laser-based lidar sensors capable of scanning vertically and/or horizontally, such as a 10° lidar scan, a 30° lidar scan, a 50° lidar scan, etc.). The configuration, FOV, sensitivity, and output of the sensors 145 can be selected based on the desired detection capabilities. In some embodiments, the sensors 145 can include both presence/distance detectors (e.g., radar sensors, lidar sensor, etc.) and one or more cameras, such as three-dimensional or two-dimensional cameras. Distances or depths between the sensors and one or more surfaces of packages can be determined using, for example, one or more image recognition algorithms. The display unit 147 can be used to view image data, view sensor status, perform calibration routines, view logs and/or reports, or other information or data, such as, but not limited to, symbology representative of targeted, non-targeted, registered, and/or unregistered instances of packages 112.

To control the robotic system 100, the PU 150 can use output from one or both the sensors 145 and sensors 161. In some embodiments, image output from sensors 161 is used to determine an overall transfer plan, including an order for transporting objects. Image output from the sensors 145, as well as sensors 205 (e.g., a force detector assembly), can be used to position a multi-gripping assembly with respect to objects, confirm object pickup, and monitor transport steps.

With continued reference to FIG. 6, the RDS 170 could include any database and/or memory storage device (e.g., a non-transitory computer-readable media) configured to store the registration records 172 for a plurality of the packages 112, data 173 for vacuum grippers. For example, the RDS 170 can include read-only memory (ROM), compact disc (CD), solid-state memory, secure digital cards, compact flash cards, and/or data storage servers or remote storage devices.

In some embodiments, the registration records 172 can each include physical characteristics or attributes for the corresponding package 112. For example, each registration record 172 can include, but is not be limited to, one or more template SIs, vision data (e.g., reference radar data, reference lidar data, etc.), 2-D or 3-D size measurements, a weight, and/or center of mass (CoM) information. The template SIs can represent known or previously determined visible characteristics of the package including the design, marking, appearance, exterior shape/outline, or a combination thereof of the package. The 2-D or 3-D size measurements can include lengths, widths, heights, or combination thereof for the known/expected packages.

In some embodiments, the RDS 170 can be configured to receive a new instance of the registration record 172 (e.g., for a previously unknown package and/or a previously unknown aspect of a package) created in accordance with the embodiments disclosed below. Accordingly, the robotic system 100 can automate the process for registering the packages 112 by expanding the number of registration records 172 stored in the RDS 170, thereby making a de-palletizing operation more efficient with fewer unregistered instances of the packages 112. By dynamically (e.g., during operation/deployment) updating the registration records 172 in the RDS 170 using live/operational data, the robotic system 100 can efficiently implement a computer-learning process that can account for previously unknown or unexpected conditions (e.g., lighting conditions, unknown orientations, and/or stacking inconsistencies) and/or newly encountered packages. Accordingly, the robotic system 100 can reduce the failures resulting from "unknown" conditions/packages, associated human operator interventions, and/or associated task failures (e.g., lost packages and/or collisions).

The RDS 170 can include vacuum gripper data 173, including, but not limited to, characteristics or attributes, including the number of addressable vacuum regions, carrying capability of a vacuum gripper device (e.g., multi-gripper assembly), vacuum protocols (e.g., vacuum levels, airflow rates, etc.), or other data used to control the robotic arm system 130 and/or end effector 140. An operator can input information about the vacuum gripper installed in the robotic arm system 130. The RDS 170 then identifies vacuum gripper data 173 corresponding to the vacuum gripper device for operation. In some embodiments, the vacuum gripper device (e.g., gripper assembly 141 of FIG. 3) is automatically detected by the robotic arm 139, and the RDS 170 is used to identify information about the detected vacuum gripper device. The identified information can be used to determine settings of the vacuum gripper device. Accordingly, different vacuum gripper devices or multi-gripper assemblies to be installed and used with the robotic arm system 130.

End Effectors

Figure 7:
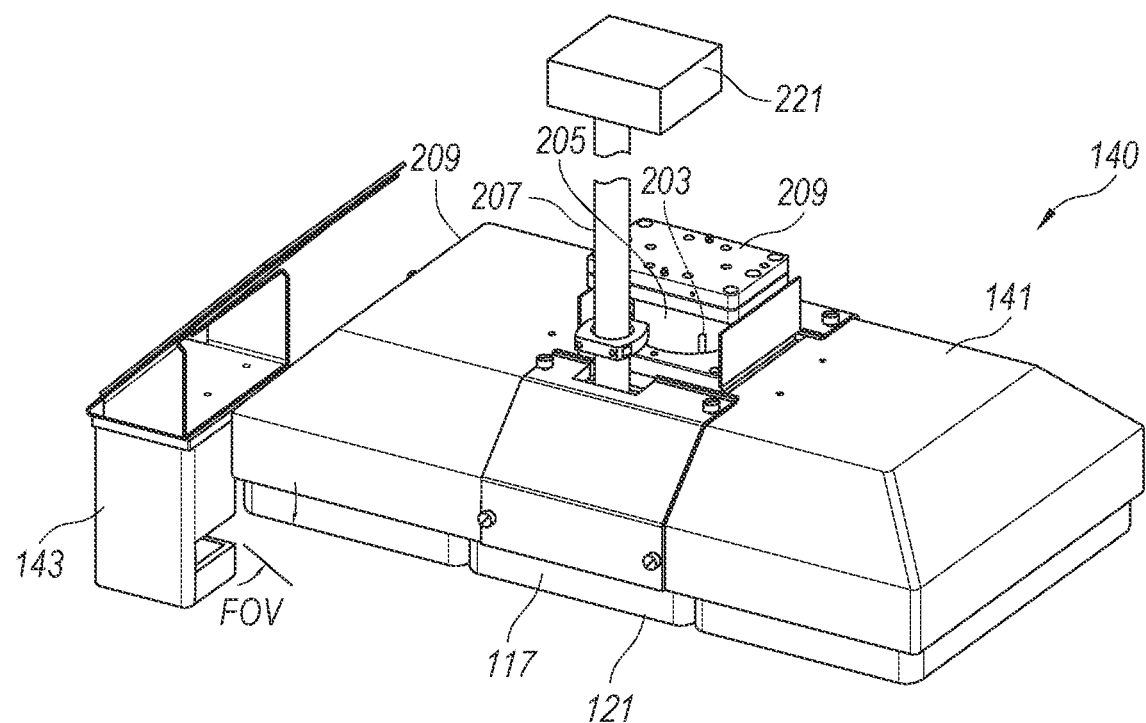
FIG. 7 is a front, top isometric view of an end effector with a multi-gripper assembly in accordance with one or more embodiments of the present technology.
Figure 8:
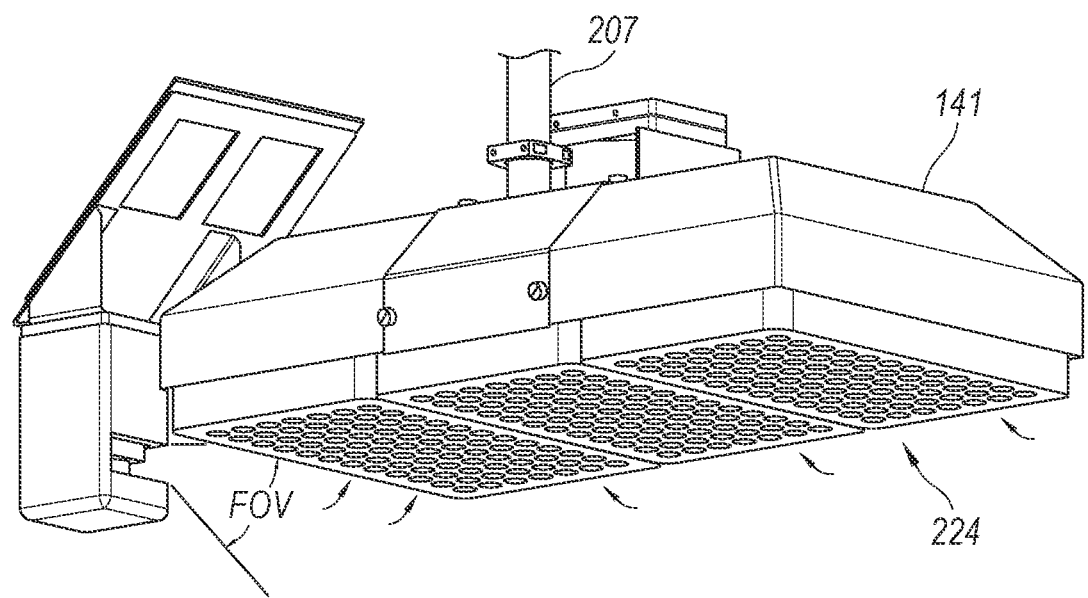
FIG. 8 is a front, bottom isometric view of the end effector of FIG. 7.

FIG. 7 is a front, top isometric view of a portion of the end effector 140 in accordance with one or more embodiments of the present technology. FIG. 8 is a front, bottom isometric view of the end effector 140 of FIG. 7. Referring now to FIG. 7, the end effector 140 can include a mounting interface or bracket 209 ("mounting bracket 209") and a force detector assembly 205 coupled to the bracket 209 and the gripper assembly 141. A fluid line 207 can be fluidically coupled to a pressurization device, such as a vacuum source 221 (not shown in FIG. 8) and the gripper assembly 141.

The FOV (a variable or a fixed FOV) of the vision sensor device 143 is directed generally underneath the gripper assembly 141 to provide detection of any objects carried underneath the gripper assembly 141. The vision sensor device 143 can be positioned along the perimeter of the end effector 140 such that the vision sensor device 143 is below the substantially horizontal plane of one or more of the vacuum regions 117 (one identified), and more specifically, the gripping surface of the gripping interface 121 (one identified). The term "substantially horizontal" generally refers to an angle within about +/−2 degrees of horizontal, for example, within about +/−1 degree of horizontal, such as within about +/−0.7 degrees of horizontal. In general, the end effector 140 includes multiple vacuum regions 117 that enable the robotic system 100 to grip the target objects that otherwise would not be grippable by a single instance of the vacuum regions 117. However, a larger area will be obscured from detection sensors due to the larger size of the end effector 140 relative to the end effector 140 with the single instance of vacuum regions 117. As one advantage, the vision sensor device 143 positioned below the horizontal plane of the gripping interface 121 can provide the vision sensor device 143 with a FOV that includes the gripping interface 121 during contact initiation with objects, including the target object, that would normally be obscured for other instances of the vision sensor device 143 that are not attached to the end effector 140 or positioned in different locations within the operating environment of the robotic system 100. As such, the unobscured FOV can provide the robotic system with real-time imaging sensor information during the gripping operations, which can enable real-time or on the fly adjustments to the position and motion of the end effector 140. As a further advantage, the proximity between the vision sensor device 143 positioned below the horizontal plane of the gripping interface 121 and objects (e.g., non-targeted objects 112a, 112b of FIG. 3) increases the precision and accuracy during the gripping operation, which can protect or prevent damage to the target object 112 and the non-targeted objects adjacent to the target object 112,a 112b from the end-effector 140, such as by crushing of the objects.

For illustrative purposes, the vision sensor device 143 can be positioned at a corner of the end-effector 140 along the effector width, however, it is understood that the vision sensor device 143 can be positioned differently. For example, the vision sensor device 143 can be positioned at the center of the width or length of the end-effector 140. As another example, the vision sensor device 143 can be positioned at another corner or other positions along the effector length.

The vacuum source 221 (FIG. 7) can include, without limitation, one or more pressurization devices, pumps, valves, or other types of devices capable of providing a negative pressure, drawing a vacuum (including partial vacuum), or creating a pressure differential. In some embodiments, air pressure can either be controlled with one or more regulators, such as a regular between the vacuum source 221 and the gripper assembly 141 or a regulator in the gripper assembly 141. When the vacuum source 221 draws a vacuum, air can be drawn (indicated by arrows in FIG. 8) into the bottom 224 of the gripper assembly 141. The pressure level can be selected based on the size and weight of the objects to be carried. If the vacuum level is too low, the gripper assembly 141 may not be able to pick up the target object(s). If the vacuum level is too high, the outside of the package could be damaged (e.g., a package with an outer plastic bag could be torn due to a high vacuum level). According to some embodiments, the vacuum source 221 can provide vacuum levels of approximately 100 mBar, 500 mBar, 1,000 mBar, 2,000 mBar, 4,000 mBar, 6,000 mBar, 8,000 mBar, or the like. In alternative embodiments, higher or lower vacuum levels are provided. In some embodiments, the vacuum level can be selected based on the desired gripping force. The vacuum gripping force of each region 117 can be equal to or greater than about 50N, 100N, 150N, 200N, or 300N at a vacuum level (e.g., 25%, 50%, or 75% maximum vacuum level, i.e., maximum vacuum level for the vacuum source 221). These gripping forces can be achieved when picking up a cardboard box, plastic bag, or other suitable package for transport. Different vacuum levels can be used, including when transporting the same object or different objects. For example, a relatively high vacuum can be provided to initially grip the object. Once the package has been gripped, the gripping force (and therefore the vacuum level) required to continue to hold the object can be reduced, so a lower vacuum level can be provided. The gripping vacuum can be increased to maintain a secure grip when performing certain tasks.

The force detector assembly 205 can include one or more sensors 203 (one illustrated) configured to detect forces indicative of the load carried by the end effector 140. The detected measurements can include linear forces measurements along an axis and/or axes of a coordinate system, moment measurements, pressures measurements, or combinations thereof. In some embodiments, the sensor 203 can be a F-T sensor that includes a component with six-axis force sensors configured to detect up to three axis forces (e.g., forces detected along x-, y-, and z-axes of a Cartesian coordinate system) and/or three axis moments (e.g., moments detected about x-, y-, and z-axes of the Cartesian coordinate system). In some embodiments, the sensor 203 could include a built-in amplifier and microcomputer for signal processing, an ability to make static and dynamic measurements, and/or an ability to detect instant changes based on a sampling interval. In some embodiments with reference made to the Cartesian coordinate system, force measurement(s) along one or more axis (i.e., F(x-axis), F(y-axis), and/or F(z-axis)) and/or moment measurement(s) about one or more axis (i.e., M(x-axis), M(y-axis), and/or M(z-axis)) may be captured via the sensor 203. By applying CoM calculation algorithms, the weight of the packages, positions of packages, and/or number of packages can be determined. For example, the weight of the packages may be computed as a function of the force measurement(s), and the CoM of the package may be computed as a function of the force measurement(s) and the moment measurement(s). In some embodiments, the weight of the packages is computed as a function of the force measurement(s), package position information from the vision sensor device 143, and/or gripping information (e.g., locations at which a seal with the package(s) is achieved). In some embodiments, the sensors 203 could be communicatively coupled with a processing unit (e.g., PU 150 of FIG. 6) via wired and/or wireless communications.

In some embodiments, output readings from both the force detector assembly 205 and the vision sensor device 143 can be used. For example, relative positions of objects can be determined based on output from the vision sensor device 143. The output from the force detector assembly 205 can then be used to determine information about each object, such as the weight/mass of each object. The force detector assembly 205 can include contact sensors, pressure sensors, force sensors, strain gauges, piezoresistive/piezoelectric sensors, capacitive sensors, elastoresistive sensors, torque sensors, linear force sensors, or other tactile sensors, configured to measure a characteristic associated with a direct contact between multiple physical structures or surfaces. For example, the force detector assembly 205 can measure the characteristic that corresponds to a grip of the end-effector on the target object or measure the weight of the target object. Accordingly, the force detector assembly 205 can output a contact measure that represents a quantified measure, such as a measured force or torque, corresponding to a degree of contact or attachment between the gripper and the target object. For example, the contact measure can include one or more force or torque readings associated with forces applied to the target object by the end-effector. The output from the force detector assembly 205 or other detectors that are integrated with or attached to the end effector 140. For example, the sensor information from the contact sensors, such as weight or weight distribution of the target object based on the force torque sensor information, in combination with the imaging sensor information, such as dimension of the target object, can be used by the robotic system to determine the identity of the target object, such as by an auto-registration or automated object registration system.

Figure 9:
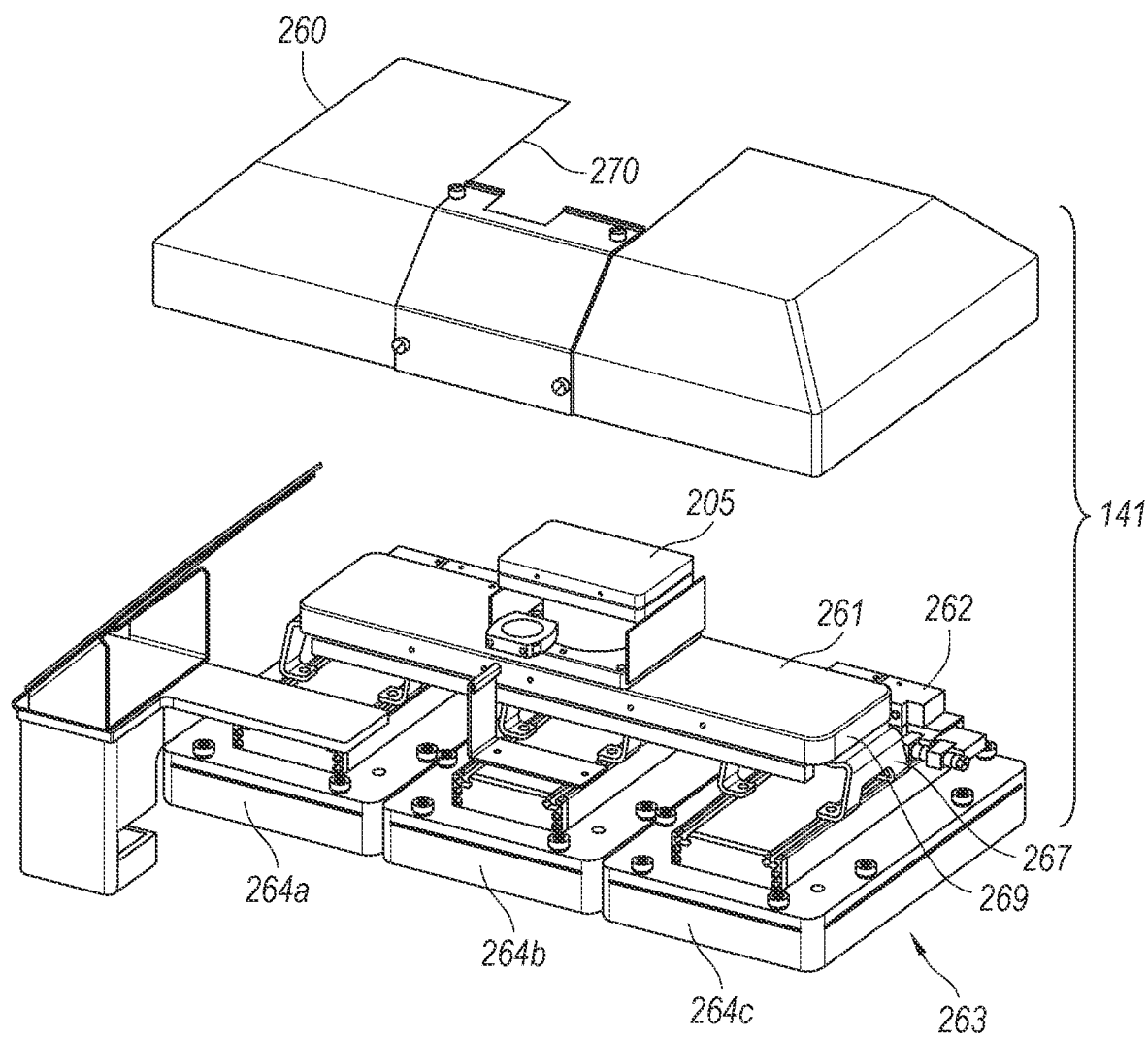
FIG. 9 is an exploded front isometric view of components of a vacuum gripper assembly with one or more embodiments of the present technology.

FIG. 9 is an exploded isometric view of the gripper assembly 141 in accordance with one or more embodiments of the present technology. The gripper assembly 141 includes a housing 260 and an internal assembly 263. The housing 260 can surround and protect the internal components and can define an opening 270 configured to receive at least a portion of the force detector assembly 205. The internal assembly 263 can include a gripper bracket assembly 261 ("bracket assembly 261"), a manifold assembly 262, and a plurality of grippers 264a, 264b, 264c (collectively "grippers 264"). The bracket assembly 261 can hold each of the vacuum grippers 264, which can be fluidically coupled in series or parallel to a fluid line (e.g., fluid line 207 of FIG. 7) via the manifold assembly 262, as discussed in connection with FIGS. 10 and 11. In some embodiments, the bracket assembly 261 includes an elongated support 269 and brackets 267 (one identified) connecting the grippers 264 to the elongated support 269. The gripper assembly 141 can include suction elements, sealing members (e.g., sealing panels), and other components discussed in connection with FIGS. 13-15.

Figure 10:
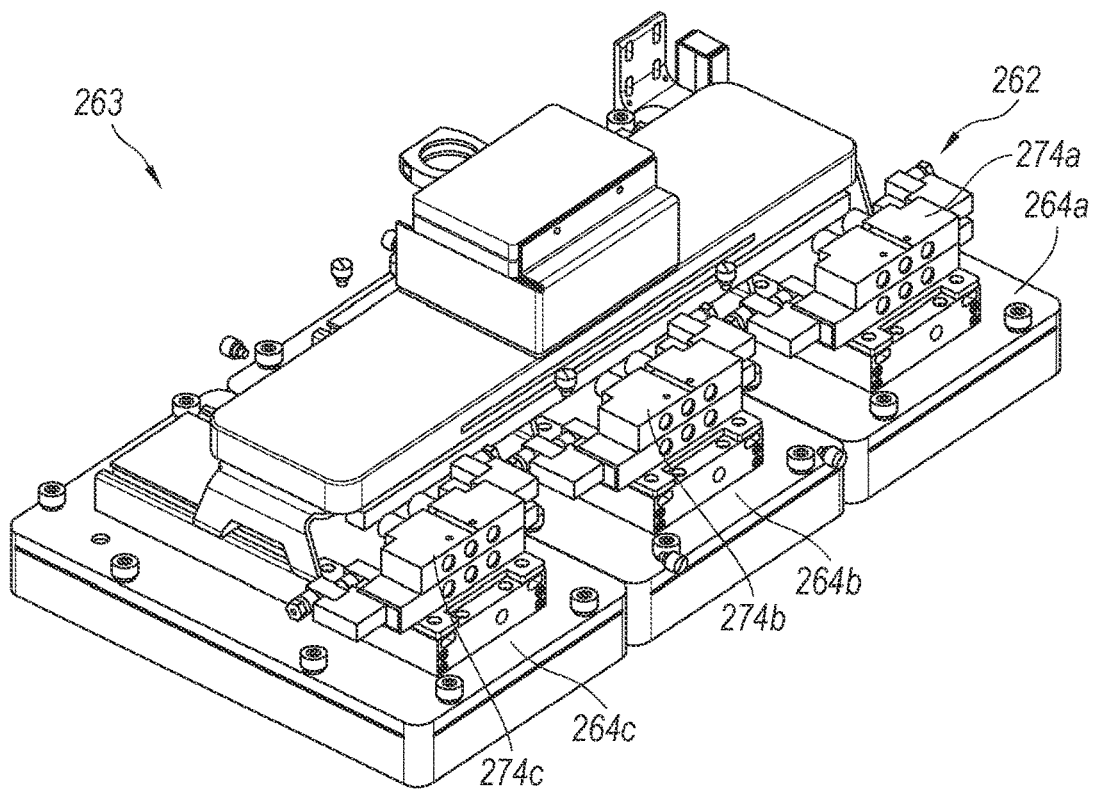
FIG. 10 is an isometric view of an assembly of vacuum grippers in accordance with one or more embodiments of the present technology.
Figure 11:
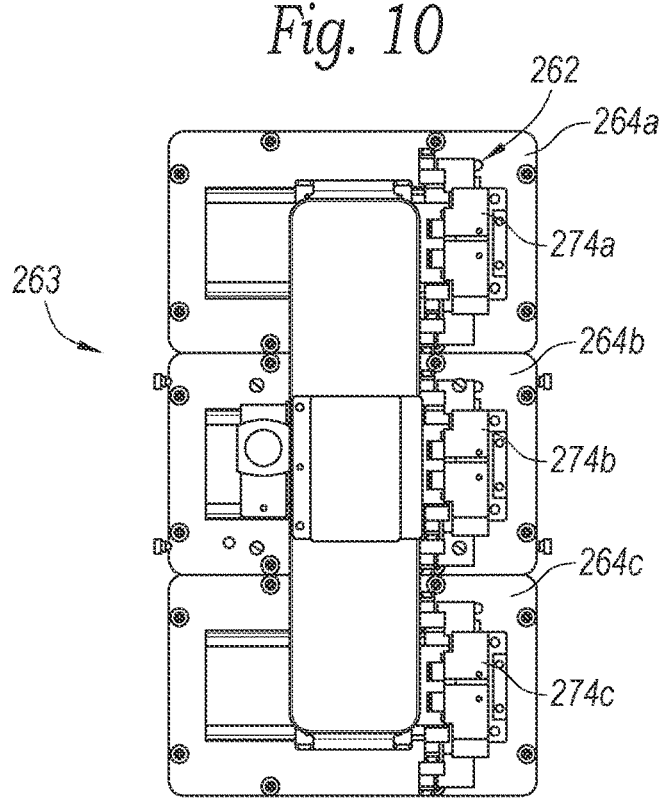
FIG. 11 is a top plan view of the assembly of FIG. 10.

FIGS. 10 and 11 are a rear, top isometric view and a plan view, respectively, of components of the gripper assembly in accordance with one or more embodiments of the present technology. The manifold assembly 262 can include gripper manifolds 274a, 274b, 274c (collectively "manifolds 274") coupled to respective grippers 264a, 264b, 264c. For example, the manifold 274a controls air flow associated with the gripper 264a. In some embodiments, the manifolds 274 can be connected in parallel or series to a pressurization source, such as the vacuum source 221 of FIG. 7. In other embodiments, each manifold 274 can be fluidly coupled to an individual pressurization device.

The manifolds 274 can be operated to distribute the vacuum to one, some, or all of the grippers 264. For example, the manifold 274a can be in an open state to allow air to flow through the bottom of the gripper 264a. The air flows through the manifold 274a, and exits the vacuum gripper assembly via a line, such as the line 207 of FIG. 7. The other manifolds 274b, 274c can be in a closed state to prevent suction at the manifolds 274b, 274c. Each manifold 274a can include, without limitation, one or more lines connected to each of the suction elements. In other embodiments, the suction elements of the gripper 264a are connected to an internal vacuum chamber. The gripper manifolds 274 can include, without limitation, one or more lines or passages, valves (e.g., check valves, globe valves, three-way valves, etc.), pneumatic cylinders, regulators, orifices, sensors, and/or other components capable of controlling the flow of fluid. Each manifold 274 can be used to distribute suction evenly or unevenly to suction elements or groups of suction elements to produce uniform or nonuniform vacuum gripping forces. An electronics line can communicatively couple the manifolds 274 to a controller to provide power to and control over components of the modules and components thereof. In one embodiment, individual manifolds 274 can include common interfaces and plugs for use with common interfaces and plugs, which may make it possible to add and remove manifolds 274 and components quickly and easily, thereby facilitating system reconfiguration, maintenance, and/or repair.

Figure 12:
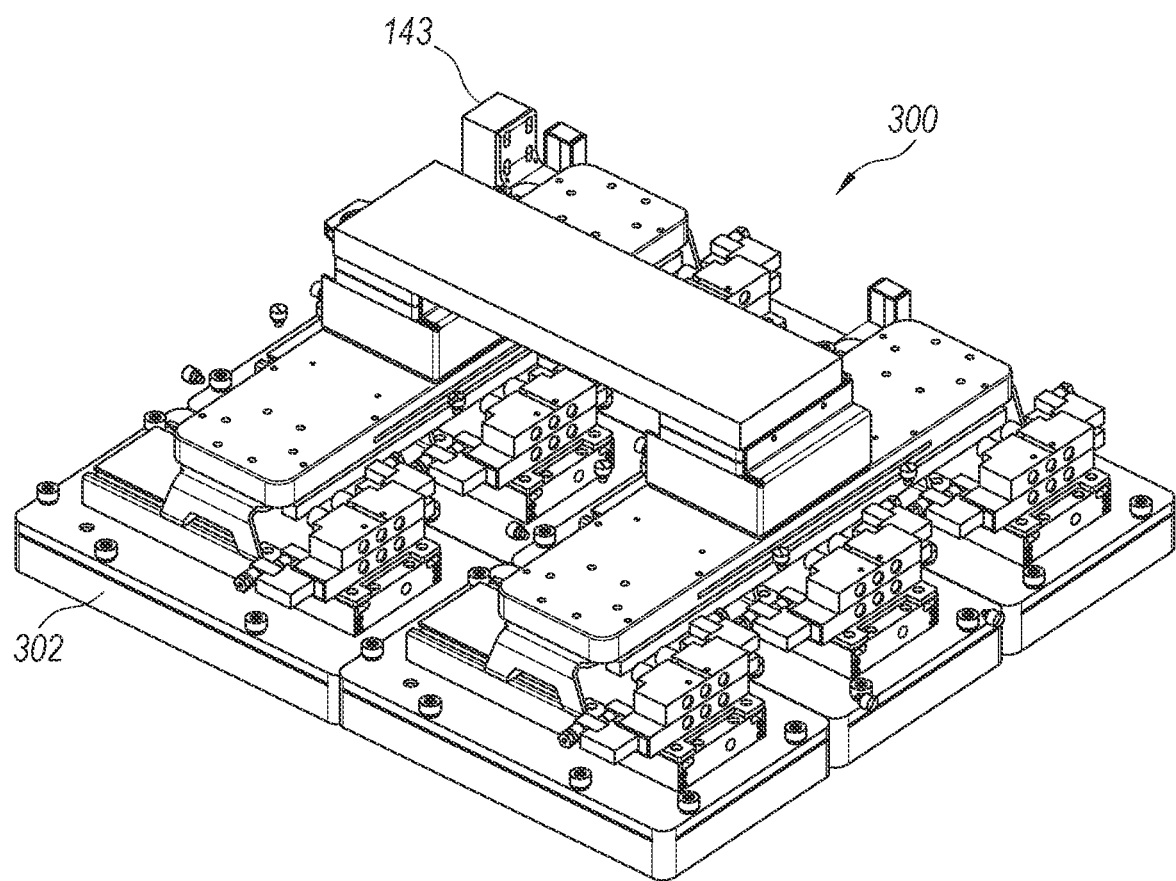
FIG. 12 is an isometric view of an assembly of vacuum grippers in accordance with one or more embodiments of the present technology.

The number, arrangement, and configuration of the grippers can be selected based on a desired number of addressable vacuum regions. FIG. 12 is an isometric view of internal components of a vacuum gripper assembly 300 (housing not shown) suitable for use with the environment of FIGS. 1-2 and the transfer assembly 141 of FIGS. 3-6 in accordance with one or more embodiments of the present technology. The vacuum gripper assembly 300 can include six vacuum grippers 302 (one identified) in a generally rectangular arrangement. In other embodiments, the grippers can be in a circular arrangement, square arrangement, or other suitable arrangement and can have similar or different configurations. The grippers can have other shapes including, without limitation, oval shapes, non-polygonal shapes, or the like. The grippers can include suction elements (e.g., suction tubes, suction cups, sealing member, etc.), sealing member, valve plates, gripper mechanisms, and other fluidic components for providing gripping capability.

One or more sensors, vision sensor devices, and other component discussed in connection with FIGS. 1-11 can be incorporated into or used with the vacuum gripper assembly 300. Suction elements, sealing member, and other components are discussed in connection with FIGS. 13-15.

The vacuum grippers can be arranged in series. For example, vacuum grippers can be arranged one next to another in a 1×3 configuration, which provides two lateral gripping position and one central gripping position. However, it is understood that the end effectors can include a different number of the vacuum grippers, suction channel banks, or vacuum regions in different configurations relative to one another. For example, the end effector can include four of the vacuum grippers or suction channel banks arranged in a 2×2 configuration. The vacuum regions can have a width dimension that is the same or similar to the length dimension to have a symmetric square shape. As another example, the end effector can include a different number of the vacuum regions, such as two of vacuum regions or more than three of vacuum regions having the same or different length dimension and/or width dimension form one another. In yet a further example, the vacuum grippers can be arranged in various configurations, such as a 2×2 configuration with four of the vacuum regions, a 1:2:2 configuration that includes five of the vacuum grippers, or other geometric arrangements and/or configurations.

Figure 13:
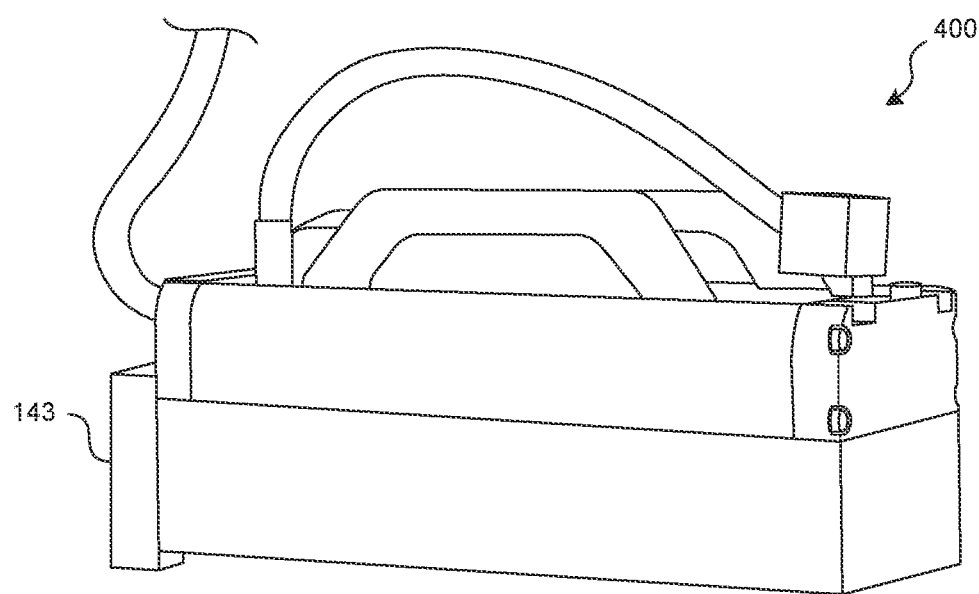
FIG. 13 is an isometric view of a multi-gripper assembly in accordance with another embodiment of the present technology.
Figure 14:
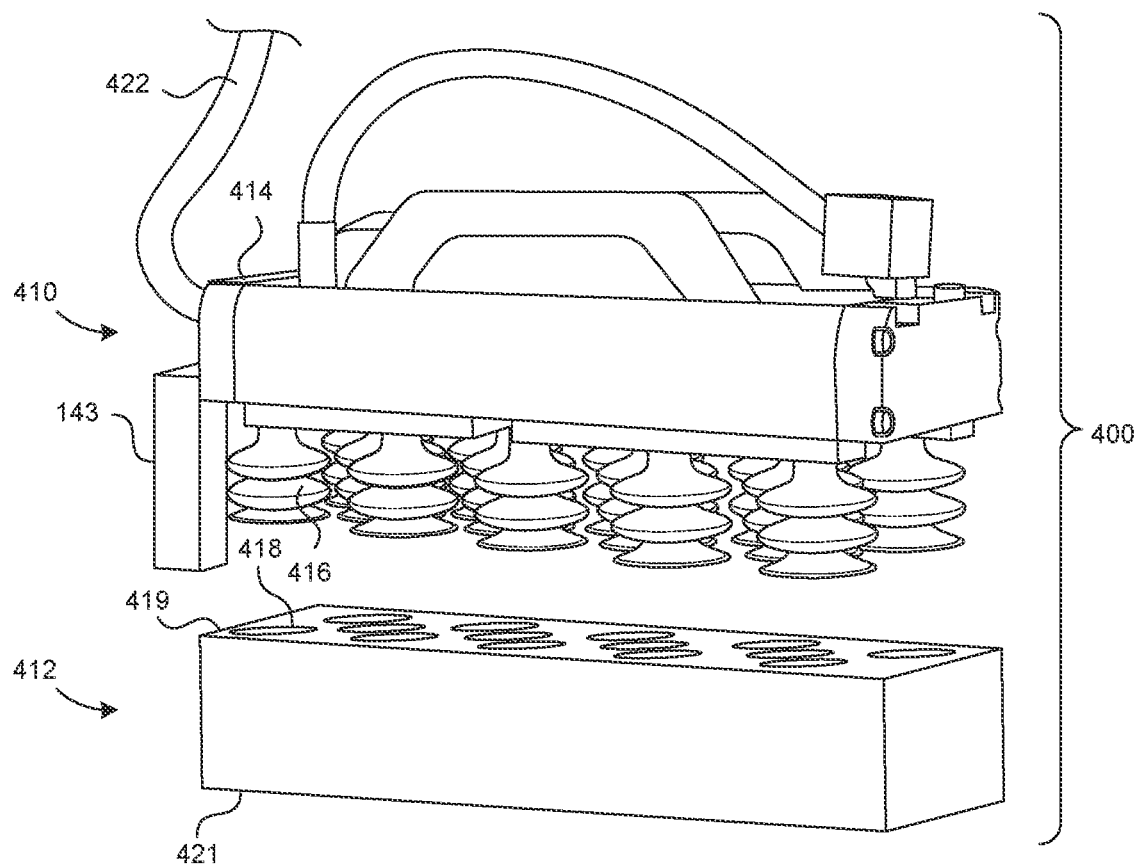
FIG. 14 is an exploded isometric view of the multi-gripper assembly of FIG. 13.

FIG. 13 shows a multi-gripper assembly 400 ("gripper assembly 400") suitable for use with robotic systems (e.g., robotic system 100 of FIGS. 1-2) in accordance with some embodiments of the present technology. FIG. 14 is an exploded view of the gripper assembly 400 of FIG. 13. The gripper assembly 400 can be any gripper or gripper assembly configured to grip a package from a stationary position (e.g., a stationary position on a de-palletizing platform such as a platform 110 of FIG. 3). The gripper assembly device 400 can include a gripper mechanism 410 and a contact or sealing member 412 ("sealing member 412"). The gripper mechanism 410 includes a main body 414 and a plurality of suction elements 416 (one identified in FIG. 14) each configured to pass through an opening 418 (one identified in FIG. 14) of the member 412. When assembled, each of the suction elements 416 can extend through, either partially or completely, a corresponding opening 418. For example, the suction elements 416 can extend through a first side 419 toward the second side 421 of the sealing member 412.

Figure 15:
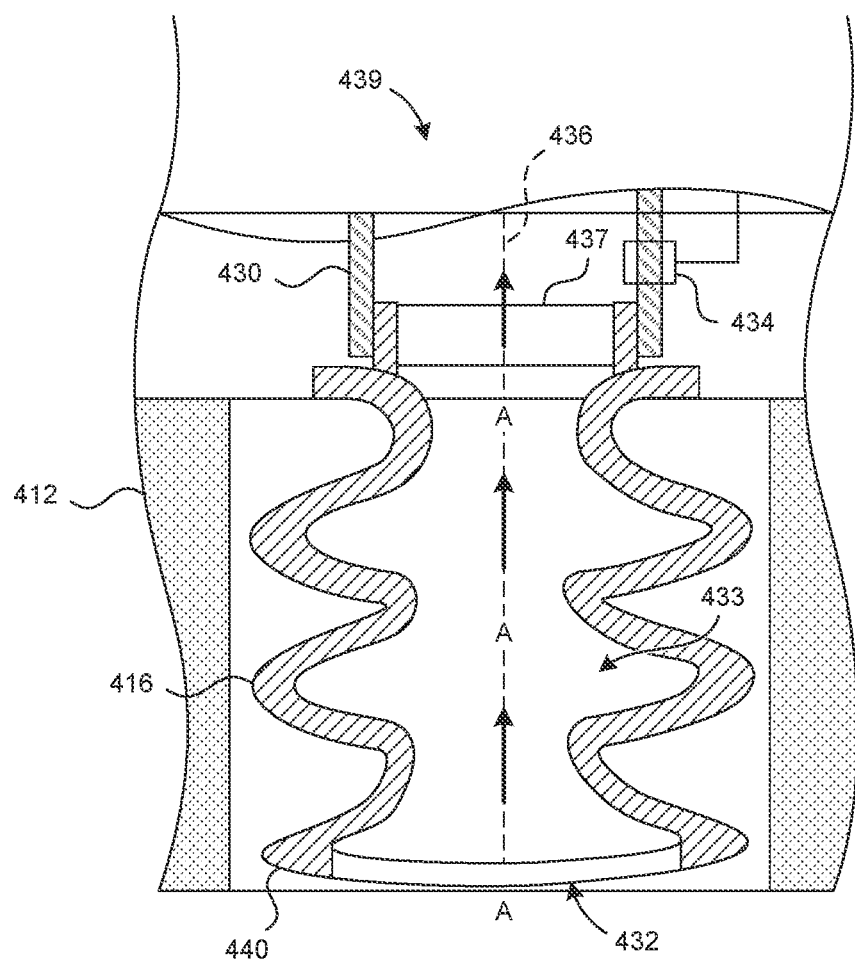
FIG. 15 is a partial cross-sectional view of a portion of a multi-gripper assembly in accordance with one or more embodiments of the present technology.

FIG. 15 is a partial cross-sectional view of the sealing member 412 and the suction element 416. The suction element 416 can be in fluid communication with a line (e.g., line 422 of FIG. 14) via a vacuum chamber and/or internal conduit 430. A valve 437 (e.g., check valve, relief valve, etc.) can be positioned along an air flow path 436. A sensor 434 can be positioned to detect a vacuum level and can be in communication, via a wired or wireless connection, with a controller (e.g., controller 109 of FIG. 1) or processing unit (e.g., processing unit 150 of FIG. 6). A lower end 440 of the suction element 416 can include, without limitation, a suction cup or another suitable feature for forming a desired seal (e.g., a generally airtight seal or other suitable seal) with an object's surface. When the lower end 440 is proximate to or contacts the object, the object can be pulled against the sealing member 412 when air is drawn into a port/inlet 432 ("inlet 432") of the suction element 416 (as indicated by arrows). The air flows upwardly along a flow path 426 and through a passageway 433 of the suction element 416. The air can flow through a valve 437 and into the conduit 430. In some embodiments, the conduit 430 can be connected to a vacuum chamber 439. For example, some or all of the suction elements 416 can be connected to the vacuum chamber 439. In other embodiments, different groups of suction elements 416 can be in fluid communication with different vacuum chambers. The suction elements 416 can have an undulating or bellowed configuration, as shown, to allow axial compression without constricting the airflow passageway 433 therein. The configurations, heights, and dimensions of the suction elements 416 can be selected based on the desired amount of compressibility.

The sealing member 412 can be made, in whole or part, of compressible materials configured to deform to accommodate surfaces with different geometries, including highly contoured surfaces. The sealing member 412 can be made, in whole or in part, of foam, including closed-cell foam (e.g., foam rubber). The material of the sealing member 412 can be porous to allow small amounts of air flow (i.e., air leakage) to avoid applying high negative pressures that could, for example, damage packaging, such as plastic bags.

Operational Flow

Figure 16:
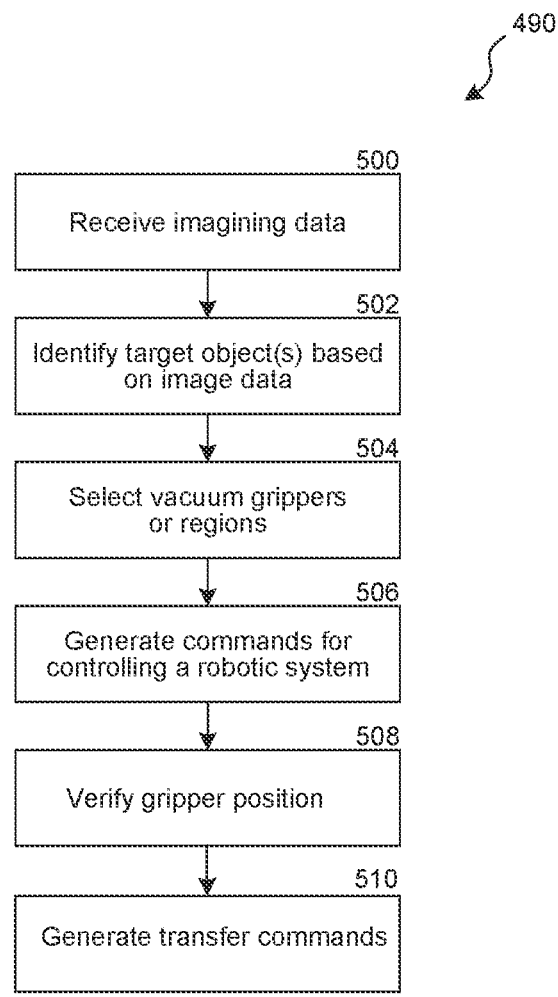
FIG. 16 is a flow diagram for operating a robotic system in accordance with some embodiments of the present technology.

FIG. 16 is a flow diagram of a method 490 for operating a robotic system in accordance with one or more embodiments of the present disclosure. In general, a transport robot can receive image data representative of at least a portion of a pickup environment. The robot system can identify target objects based on the received image data. The robot system can use a vacuum gripper assembly to hold onto the identified target object(s). Different units, assemblies, and sub-assemblies of the robot systems 100 of FIG. 1 can perform the method 490. Details of the method 490 are discussed in detail below.

At block 500, the robotic system 100 can receive image data representative of at least a portion of an environment. For example, the received image data can be representative of at least a portion of the stack 165 at the pickup environment 163 of FIG. 3. The image data can include, without limitation, video, still images, lidar data, radar data, bar code data, or combinations thereof. In some embodiments, for example, the sensors 161 of FIG. 3 can capture video or still images that are transmitted (e.g., via a wired or wireless connection) to a computer or controller, such as the controller 109 of FIGS. 1 and 6.

At block 502, the computer 109 (FIG. 1) can analyze image data to identify target objects in a group of objects, a stacked of objects, etc. For example, the controller 109 can identify individual objects based on the received image data and surface images/data stored by the RDS 170 (FIG. 6). In some embodiments, information from the drop off location is used to select the target object. For example, a target object can be selected based on the amount of available space at the drop off location, preferred stacking arrangement, etc. A user can input selection criteria for determining the order of object pick up. In some embodiments, a mapping of the pickup environment (e.g., pickup environment 163 of FIG. 3) can be generated based on the received image data. In some mapping protocols, edge detection algorithms are used to identify edges of objects, surfaces, etc. The mapping can be analyzed to determine which objects at the pickup region are capable of being transported together. In some embodiments, a group of objects capable of being simultaneously lifted and carried by the vacuum gripper are identified as targeted objects.

The robotic system 100 of FIG. 1 can select the target package or object 112 from source objects as the target of a task to be performed. For example, the robotic system 100 can select the target object to be picked up according to a predetermined sequence, set of rules, templates of object outlines, or a combination thereof. As a specific example, the robotic system 100 can select the target package as an instance of the source packages that are accessible to the end effector 140, such as an instances of the source packages 112 located on top of a stack of the source packages, according to the point cloud/depth map representing the distances and positions relative to a known location of the image devices. In another specific example, the robotic system 100 can select the target object as an instance of the source packages 112 located at a corner or edge and have two or more surfaces that are exposed to or accessible to the end effector 140. In a further specific example, the robotic system 100 can select the target object according to a predetermined pattern, such as left to right or nearest to furthest relative to a reference location, without or minimally disturbing or displacing other instances of the source packages.

At block 504, the controller 109 can select the vacuum grippers or regions for gripping the target objects. For example, the controller 109 (FIG. 1) can select the vacuum region 117a (FIG. 4) for gripping the package 112, illustrated in FIG. 3, because substantially the entire package 112 (i.e., target object) is directly beneath the vacuum region 117a. A vacuum to be drawn through substantially all of the suction elements 151 (e.g., at least 90%, 95%, 98% of the suction elements 151) of the vacuum region 117a of FIG. 4.

At block 506, the controller 109 generates one or more commands for controlling the robotic system 100. In some modes of operation, the commands can cause the robotic system to suck in air at the identified or selected addressable vacuum regions. For example, the controller 109 can generate one or more pickup commands to cause a vacuum source (e.g., vacuum source 221 of FIG. 7) to provide a vacuum at a selected vacuum level. The vacuum level can be selected based on the weight or mass of the target object(s), tasks to be performed, etc. Commands can be sent to the gripper assembly 141 to cause the manifold 262 to operate to provide suction at the selected regions or grippers. Feedback from the vision sensor device 143 (FIG. 7) can be used to monitor the pickup and transfer process.

At block 508, the vision sensor device 143 can be used to verify the position of the end effector 140 relative to objects, including source or target objects, such as the packages 112 of FIG. 1. The vision sensor device 143 can be used to continuously or periodically monitor the relative position of the end effector 140 relative to objects before and during object pickup, during object transport, and/or during and after object drop off. The output from vision sensor device 143 can also be used to count objects, (e.g., count the number of target or source objects) or otherwise analyze objects, including analyzing stacks of objects. The vision sensor device 143 can also be used to obtain environmental information used to navigate the robotic system 100.

At block 510, the controller 109 generates command to cause actuation devices (e.g., actuation devices 212), motors, servos, actuators, and other components of the robotic arm 139 to move the gripper assembly 141. Transfer commands can be generated by the robotic system to cause the robotic transport arm to robotically move the gripper assembly 141 carrying the objects between locations. The transport commands can be generated based on a transport plan that includes a transport path to deliver the object to a drop off location without causing the object to strike another object. The vision sensor device 143 (FIG. 7) can be used to avoid collisions.

The method 490 can be performed to grip multiple target objects. The end effector 140 can be configured to grip multiple instances of the target package or object from among the source packages or objects. For example, the robotic system 100 can generate instructions for the end effector 140 to engage multiple instances of the vacuum regions 117 to perform the gripping operation to simultaneously grip multiple instances of the target object. As a specific example, the end effector 140 can be used to execute instructions for the gripping operation of gripping multiple instances of the target object separately and in sequence, one after the other. For instance, the instructions can include performing the gripping operation using one of the suction channel banks 117 to grip a first instance of the target object 112 that is in one pose or one orientation, then, if necessary, repositioning the end effector 140 to engage a second or different instance of the vacuum regions 117 to grip a second instance of the target object. In another specific example, the end effector 140 can be used to execute instructions for the gripping operation of simultaneous gripping of separate instances of the target object. For instance, the end effector 140 can be positioned to simultaneously contact two or more instances of the target object and engage each of the corresponding instances of vacuum regions 117 to perform the gripping operation on each of the multiple instances of the target object. In the above embodiments, each of the suction channel banks 117 can be independently operated as necessary to perform the different gripping operations.

Figure 17:
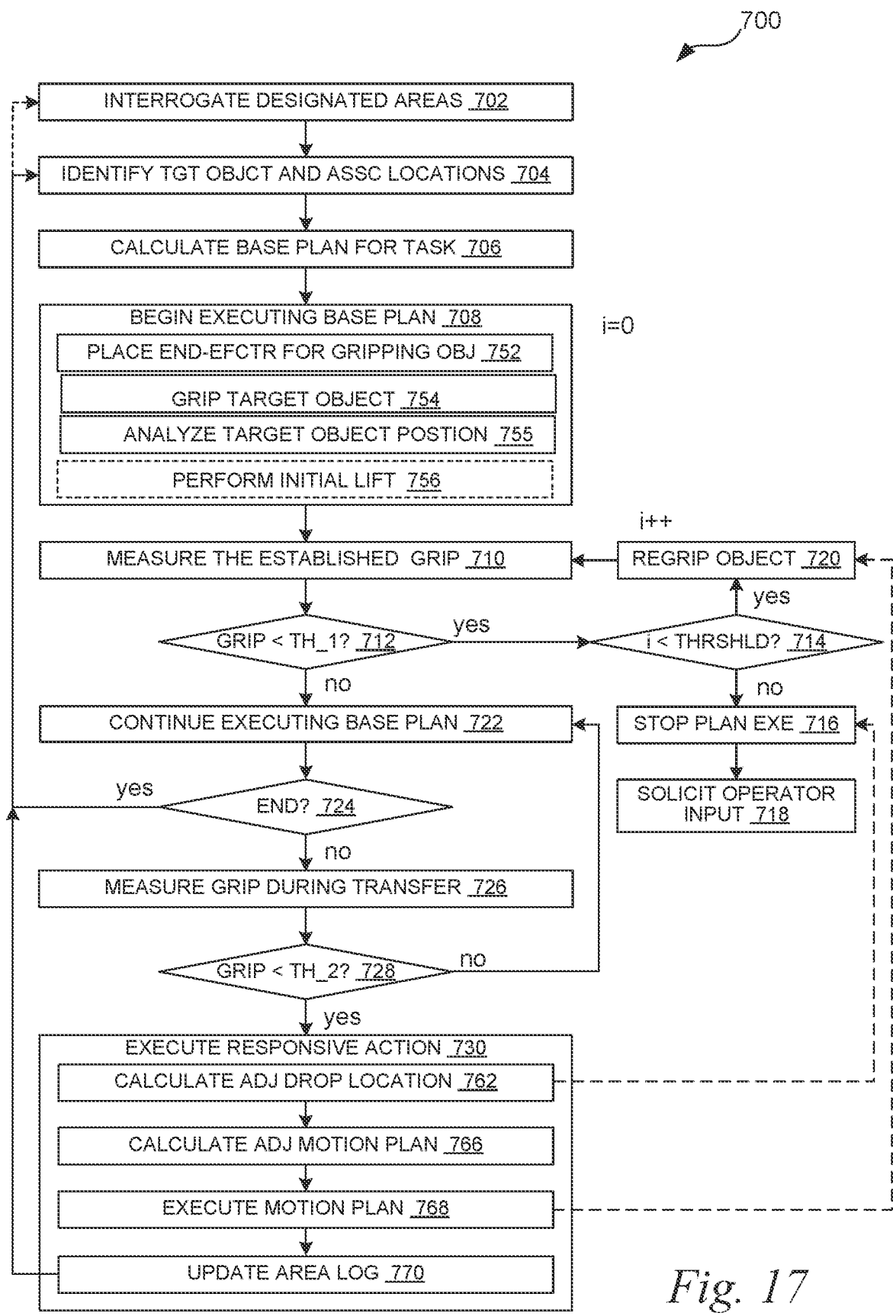
FIG. 17 is another flow diagram for operating a robotic system in accordance with one or more embodiments of the present technology.

FIG. 17 is a flow diagram of a method 700 for operating the robotic system 100 of FIG. 1 according to a base plan in accordance with one or more embodiments of the present technology. The method 700 includes steps that can be incorporated into the method 490 of FIG. 16 and can be implemented based on executing the instructions stored on one or more of the storage devices 204 of FIG. 2 with one or more of the processors 202 of FIG. 2 or the controller 109 of FIG. 6. Data captured by the vision sensor devices and sensor output can be used at various steps of the method 700 as detailed below.

At block 702, the robotic system 100 can interrogate (e.g., scan) one or more designated areas, such as the pickup area and/or the drop area (e.g., a source drop area, a destination drop area, and/or a transit drop area). In some embodiments, the robotic system 100 can use (via, e.g., commands/prompts sent by the processors 202 of FIG. 2) one or more of the imaging devices 222 of FIG. 2, sensors 161 and/or 145 of FIG. 6, or other sensors to generate imaging results of the one or more designated areas. The imaging results can include, without limitation, captured digital images and/or point clouds, object position data, or the like.

At block 704, the robotic system 100 can identify the target package 112 of FIG. 1 and associated locations (e.g., the start location 114 of FIG. 1 and/or the task location 116 of FIG. 1). In some embodiments, for example, the robotic system 100 (via, e.g., the processors 202) can analyze the imaging results according to a pattern recognition mechanism and/or a set of rules to identify object outlines (e.g., perimeter edges or surfaces). The robotic system 100 can further identify groupings of object outlines (e.g., according to predetermined rules and/or pose templates) as corresponding to each unique instance of objects. For example, the robotic system 100 can identify the groupings of the object outlines that correspond to a pattern (e.g., same values or varying at a known rate/pattern) in color, brightness, depth/location, or a combination thereof across the object lines. Also, for example, the robotic system 100 can identify the groupings of the object outlines according to predetermined shape/pose templates defined in the master data.

From the recognized objects in the pickup location, the robotic system 100 can select (e.g., according to a predetermined sequence or set of rules and/or templates of object outlines) one as the target packages 112. For example, the robotic system 100 can select the target package(s) 112 as the object(s) located on top, such as according to the point cloud representing the distances/positions relative to a known location of the sensor. Also, for example, the robotic system 100 can select the target package 112 as the object(s) located at a corner/edge and have two or more surfaces that are exposed/shown in the imaging results. The available vacuum grippers and/or regions can also be used to select the target packages. Further, the robotic system 100 can select the target package 112 according to a predetermined pattern (e.g., left to right, nearest to furthest, etc. relative to a reference location).

In some embodiments, the end effector 140 can be configured to grip multiple instances of the target packages 112 from among the source package. For example, the robotic system 100 can generate instructions for the end effector 140 to engage multiple instances of the gripper regions 117 to perform the gripping operation to simultaneously grip multiple instances of the target packages 112. As a specific example, the end effector 140 can be used to execute instructions for the gripping operation of gripping multiple instances of the target package 112 separately and in sequence, one after the other. For instance, the instructions can include performing the gripping operation using one of the gripper regions 117 to grip a first instance of the target package 112 that is in one pose or one orientation, then, if necessary, repositioning the end effector 140 to engage a second or different instance of the gripper regions 117 to grip a second instance of the target package 112. In another specific example, the end effector 140 can be used to execute instructions for the gripping operation of simultaneous gripping of separate instances of the target package 112. For instance, the end effector 140 can be positioned to simultaneously contact two or more instances of the target package 112 and engage each of the corresponding instances of gripper regions 117 to perform the gripping operation on each of the multiple instances of the target package 112. In the above embodiments, each of the gripper regions 117 can be independently operated as necessary to perform the different gripping operations.

For the selected target package 112, the robotic system 100 can further process the imaging result to determine the start location 114 and/or an initial pose. For example, the robotic system 100 can determine the initial pose of the target package 112 based on selecting from multiple predetermined pose templates (e.g., different potential arrangements of the object outlines according to corresponding orientations of the object) the one that corresponds to a lowest difference measure when compared to the grouping of the object outlines. Also, the robotic system 100 can determine the start location 114 by translating a location (e.g., a predetermined reference point for the determined pose) of the target package 112 in the imaging result to a location in the grid used by the robotic system 100. The robotic system 100 can translate the locations according to a predetermined calibration map.

In some embodiments, the robotic system 100 can process the imaging results of the drop areas to determine open spaces between objects. The robotic system 100 can determine the open spaces based on mapping the object lines according to a predetermined calibration map that translates image locations to real-world locations and/or coordinates used by the system. The robotic system 100 can determine the open spaces as the space between the object lines (and thereby object surfaces) belonging to different groupings/objects. In some embodiments, the robotic system 100 can determine the open spaces suitable for the target package 112 based on measuring one or more dimensions of the open spaces and comparing the measured dimensions to one or more dimensions of the target package 112 (e.g., as stored in the master data). The robotic system 100 can select one of the suitable/open spaces as the task location 116 according to a predetermined pattern (e.g., left to right, nearest to furthest, bottom to top, etc. relative to a reference location).

In some embodiments, the robotic system 100 can determine the task location 116 without or in addition to processing the imaging results. For example, the robotic system 100 can place the objects at the placement area according to a predetermined sequence of actions and locations without imaging the area. Additionally, the sensors (e.g., vision sensor device 143) attached to the vacuum gripper assembly 141 can output image data used to periodically image the area. The imaging results can be updated based on the additional image data. Also, for example, the robotic system 100 can process the imaging result for performing multiple tasks (e.g., transferring multiple objects, such as for objects located on a common layer/tier of a stack).

At block 706, the robotic system 100 can calculate a base plan for the target package 112. For example, the robotic system 100 can calculate the base motion plan based on calculating a sequence of commands or settings, or a combination thereof, for the actuation devices 212 of FIG. 2 that will operate the robotic system 132 of FIG. 3 and/or the end-effector (e.g., the end-effector 140 of FIGS. 3-5). For some tasks, the robotic system 100 can calculate the sequence and the setting values that will manipulate the robotic system 132 and/or the end-effector 140 to transfer the target package 112 from the start location 114 to the task location 116. The robotic system 100 can implement a motion planning mechanism (e.g., a process, a function, an equation, an algorithm, a computer-generated/readable model, or a combination thereof) configured to calculate a path in space according to one or more constraints, goals, and/or rules. For example, the robotic system 100 can use predetermined algorithms and/or other grid-based searches to calculate the path through space for moving the target package 112 from the start location 114 to the task location 116. The motion planning mechanism can use a further process, function, or equation, and/or a translation table, to convert the path into the sequence of commands or settings, or combination thereof, for the actuation devices 212. In using the motion planning mechanism, the robotic system 100 can calculate the sequence that will operate the robotic arm 206 (FIG. 3) and/or the end-effector 140 (FIG. 3) and cause the target package 112 to follow the calculated path. The vision sensor device 143 can be used to identify any obstructions and recalculate the path and refine the base plan.

At block 708, the robotic system 100 can begin executing the base plan. The robotic system 100 can begin executing the base motion plan based on operating the actuation devices 212 according to the sequence of commands or settings or combination thereof. The robotic system 100 can execute a first set of actions in the base motion plan. For example, the robotic system 100 can operate the actuation devices 212 to place the end-effector 140 at a calculated location and/or orientation about the start location 114 for gripping the target package 112 as illustrated in block 752.

At block 754, the robotic system 100 can analyze the position of objects using sensor information (e.g., information from the vision sensor device 143, sensors 216, force detector assembly 205) obtained before and/or during the gripping operation, such as the weight of the target package 112, the center of mass of the target package 112, the relative position of the target package 112 with respect to vacuum regions, or a combination thereof. The robotic system 100 can operate the actuation devices 212 and vacuum source 221 (FIG. 7) to have the end-effector 140 engage and grip the target package 112. The image data from the vision sensor device 143 and/or data from the force sensor assembly 205 can be used to analyze the position and number of the target packages 112. At block 755, the vision sensor device 143 can be used to verify the position of the end effector 140 relative to target packages 112 or other objects. In some embodiments, as illustrated at block 756, the robotic system 100 can perform an initial lift by moving the end-effector up by a predetermined distance. In some embodiments, the robotic system 100 can reset or initialize an iteration counter 'i' used to track a number of gripping actions.

At block 710, the robotic system 100 can measure the established grip. The robotic system 100 can measure the established grip based on readings from the force detector assembly 205 of FIG. 7, vision sensor device 143, or other sensors, such as the pressure sensors 434 (FIG. 15). For example, the robotic system 100 can determine the grip characteristics by using one or more of force detector assembly 205 of FIG. 3 to measure a force, a torque, a pressure, or a combination thereof at one or more locations on the robotic arm 139, one or more locations on the end-effector 140, or a combination thereof. In some embodiments, such as for the grip established by the assembly 141, contact or force measurements can correspond to a quantity, a location, or a combination thereof of the suction elements (e.g., suction elements 416 of FIG. 14) contacting a surface of the target package 112 and holding a vacuum condition therein. Additionally or alternative, the grip characteristic can be determined based on output from the vision sensor device 143. For example, image data from the sensor detector 143 can be used to determine whether the object moves relative to the end effector 140 during transport.

At decision block 712, the robotic system 100 can compare the measured grip to a threshold (e.g., an initial grip threshold). For example, the robotic system 100 can compare the contact or force measurement to a predetermined threshold. The robot system 100 can also compare image data from the detector 143 to reference image data (e.g., image data captured at initial object pickup) to determine whether the gripped objects have moved, for example, relative to one another or relative to the gripper assembly 141. Accordingly, the robotic system 100 can determine whether the contact/grip is sufficient to continue manipulating (e.g., lifting, transferring, and/or reorienting) the target package(s) 112.

When the measured grip fails to satisfy the threshold, the robotic system 100 can evaluate whether the iteration count for regripping the target packages(s) 112 has reached an iteration threshold, as illustrated at decision block 714. While the iteration count is less than the iteration threshold, the robotic system 100 can deviate from the base motion plan when the contact or force measurement fails to satisfy (e.g., is below) the threshold. Accordingly, at block 720, the robotic system 100 can operate the robotic arm 139 and/or the end-effector 140 to execute a regripping action not included in the base motion plan. For example, the regripping action can include a predetermined sequence of commands or settings, or a combination thereof, for the actuation devices 212 that will cause the robotic arm 139 to lower the end-effector 140 (e.g., in reversing the initial lift) and/or cause the end-effector 140 to release the target package(s) 112 and regrip the target package(s) 112. In some embodiments, the predetermined sequence can further operate the robotic arm 139 to adjust a position of the gripper after releasing the target object and before regripping it or altering the areas at which the vacuum is drawn. In performing the regripping action, the robotic system 100 can pause execution of the base motion plan. After executing the regripping action, the robotic system 100 can increment the iteration count.

After regripping the object, the robotic system 100 can measure the established grip as described above for block 710 and evaluate the established grip as described above for block 712. The robotic system 100 can attempt to regrip the target package 112 as described above until the iteration count reaches the iteration threshold. When the iteration count reaches the iteration threshold, the robotic system 100 can stop executing the base motion plan, as illustrated at block 716. In some embodiments, the robotic system 100 can solicit operator input, as illustrated at block 718. For example, the robotic system 100 can generate an operator notifier (e.g., a predetermined message) via the communication devices 206 of FIG. 2 and/or the input-output devices 208 of FIG. 2. In some embodiments, the robotic system 100 can cancel or delete the base motion plan, record a predetermined status (e.g., an error code) for the corresponding task, or perform a combination thereof. In some embodiments, the robotic system 100 can reinitiate the process by imaging the pickup/task areas (block 702) and/or identifying another item in the pickup area as the target object (block 704) as described above.

When the measured grip (e.g., measured grips for each retained package) satisfies the threshold, the robotic system 100 can continue executing remaining portions/actions of the base motion plan, as illustrated at block 722. Similarly, when the contact measure satisfies the threshold after regripping the target package 112, the robotic system 100 can resume execution of the paused base motion plan. Accordingly, the robotic system 100 can continue executing the sequenced actions (i.e., following the grip and/or the initial lift) in the base motion plan by operating the actuation devices 212 and/or the transport motor 214 of FIG. 2 according to the remaining sequence of commands and/or settings. For example, the robotic system 100 can transfer (e.g., vertically and/or horizontally) and/or reorient the target package 112 according to the base motion plan.

While executing the base motion plan, the robotic system 100 can track the current location and/or the current orientation of the target package 112. The robotic system 100 can track the current location according to outputs from the position sensors 224 of FIG. 2 to locate one or more portions of the robotic arm and/or the end-effector. In some embodiments, the robotic system 100 can track the current location by processing the outputs of the position sensors 224 with a computer-generated model, a process, an equation, a position map, or a combination thereof. Accordingly, the robotic system 100 can combine the positions or orientations of the joints and the structural members and further map the positions to the grid to calculate and track the current location 424. In some embodiments, the robotic system 100 can include multiple beacon sources. The robotic system 100 can measure the beacon signals at one or more locations in the robotic arm and/or the end-effector and calculate separation distances between the signal sources and the measured location using the measurements (e.g., signal strength, time stamp or propagation delay, and/or phase shift). The robotic system 100 can map the separation distances to known locations of the signal sources and calculate the current location of the signal-receiving location as the location where the mapped separation distances overlap.

At decision block 724, the robotic system 100 can determine whether the base plan has been fully executed to the end. For example, the robotic system 100 can determine whether all of the actions (e.g., the commands and/or the settings) in the base motion plan 422 have been completed. Also, the robotic system 100 can determine that the base motion plan is finished when the current location matches the task location 116. When the robotic system 100 has finished executing the base plan, the robotic system 100 can reinitiate the process by imaging the pickup/task areas (block 702) and/or identifying another item in the pickup area as the target object (block 704) as described above.

Otherwise, at block 726, the robotic system 100 can measure the grip (i.e., by determining the contact/force measurements) during transfer of the target package 112. In other words, the robotic system 100 can determine the contact/force measurements while executing the base motion plan. In some embodiments, the robotic system 100 can determine the contact/force measurements according to a sampling frequency or at predetermined times. In some embodiments, the robotic system 100 can determine the contact/force measurements before and/or after executing a predetermined number of commands or settings with the actuation devices 212. For example, the robotic system 100 can sample the contact sensors 226 after or during a specific category of maneuvers, such as for lifts or rotations. Also, for example, the robotic system 100 can sample the contact sensors 226 when a direction and/or a magnitude of an accelerometer output matches or exceeds a predetermined threshold that represents a sudden or fast movement. The robotic system 100 can determine the contact/force measurements using one or more processes described above (e.g., for block 710).

In some embodiments, the robotic system 100 can determine the orientation of the gripper and/or the target package 112 and adjust the contact measure accordingly. The robotic system 100 can adjust the contact measure based on the orientation to account for a directional relationship between a sensing direction for the contact sensor and gravitational force applied to the target object according to the orientation. For example, the robotic system 100 can calculate an angle between the sensing direction and a reference direction (e.g., "down" or the direction of the gravitational force) according to the orientation. The robotic system 100 can scale or multiply the contact/force measurement according to a factor and/or a sign that corresponds to the calculated angle.

At decision block 728, the robotic system 100 can compare the measured grip to a threshold (e.g., a transfer grip threshold). In some embodiments, the transfer grip threshold can be less than or equal to the initial grip threshold associated with evaluating an initial (e.g., before transferring) grip on the target package 112. Accordingly, the robotic system 100 can enforce a stricter rule for evaluating the grip before initiating transfer of the target package 112. The threshold requirement for the grip can be higher initially since contact sufficient for picking up the target package 112 is likely to be sufficient for transferring the target package 112.

When the measured grip satisfies (e.g., is not less than) the threshold and the correct packages are gripped (e.g., determined based on the image data from the vision sensor device 143), the robotic system 100 can continue executing the base plan as illustrated at block 722 and described above. When the measured grip fails to satisfy (e.g., is less than) the threshold or the correct packages are not gripped, the robotic system 100 can deviate from the base motion plan and execute one or more responsive actions as illustrated at block 530. When the measured grip is insufficient in light of the threshold, the robotic system 100 can operate the robotic arm 139, the end-effector, or a combination thereof according to commands and/or settings not included in the base motion plan. In some embodiments, the robotic system 100 can execute different commands and/or settings based on the current location.

For illustrative purposes, the response actions will be described using a controlled drop. However, it is understood that the robotic system 100 can execute other actions, such as by stopping execution of the base motion plan as illustrated at block 716 and/or by soliciting operator input as illustrated at block 718.

The controlled drop includes one or more actions for placing the target package 112 in one of the drop areas (e.g., instead of the task location 116) in a controlled manner (i.e., based on lowering and/or releasing the target package 112 and not as a result of a complete grip failure). In executing the controlled drop, the robotic system 100 can dynamically (i.e., in real time and/or while executing the base motion plan) calculate different locations, maneuvers or paths, and/or actuation device commands or settings according to the current location. In some embodiments, end effector 140 can be configured for a grip release operation for multiple instances of the target package 112. For example, in some embodiments, the end effector 140 can be configured for simultaneously or sequentially performing the grip release operation by selectively disengage the vacuum regions 117 as necessary to release each instance of the target package 112 accordingly. The robotic system 100 can select whether to simultaneously or sequentially release objects and the order or release based on the position of the retained objects, object arrangement at the drop area, etc.

At block 762, the robotic system 100 can calculate the adjusted drop location and/or an associated pose for placing the target package 112. In calculating the adjusted drop location, the robotic system 100 can identify the drop area (e.g., the source drop area, the destination drop area, or the transit drop area) nearest to and/or ahead (e.g., between the current location and the task location) of the current location. Also, when the current location is between (i.e., not within) the drop areas, the robotic system 100 can calculate distances to the drop areas (e.g., distances to representative reference locations for the drop areas). Accordingly, the robotic system 100 can identify the drop area that is nearest to the current location and/or ahead of the current location. Based on the identified drop area, the robotic system 100 can calculate a location therein as the adjusted drop location. In some embodiments, the robotic system 100 can calculate the adjusted drop location based on selecting a location according to a predetermined order (e.g., left to right, bottom to top, and/or front to back relative to a reference location).

In some embodiments, the robotic system 100 can calculate distances from the current location to open spaces (e.g., as identified in block 704 and/or tracked according to ongoing placements of objects) within the drop areas. The robotic system 100 can select the open space that is ahead of the current location and/or nearest to the current location 424 as the adjusted drop location.

In some embodiments, prior to selecting the drop area and/or the open space, the robotic system 100 can use a predetermined process and/or equation to translate the contact/force measure to a maximum transfer distance. For example, the predetermined process and/or equation can estimate based on various values of the contact measure a corresponding maximum transfer distance and/or a duration before a complete grip failure. Accordingly, the robotic system 100 can filter out the available drop areas and/or the open spaces that are farther than the maximum transfer distance from the current location. In some embodiments, when the robotic system 100 fails to identify available drop areas and/or open spaces (e.g., when the accessible drop areas are full), the robotic system 100 can stop executing the base motion plan, as illustrated at block 716, and/or solicit operator input, as illustrated at block 718.

At block 766, the robotic system 100 can calculate the adjusted motion plan for transferring the target package 112 from the current location to the adjusted drop location. The robotic system 100 can calculate the adjusted motion plan in a way similar to that described above for block 506.

At block 768, the robotic system 100 can execute the adjusted motion plan in addition to and/or instead of the base motion plan. For example, the robotic system 100 can operate the actuation devices 212 according to the sequence of commands or settings or combination thereof, thereby maneuvering the robotic arm 139 and/or the end-effector to cause the target package 112 to move according to the path.

In some embodiments, the robotic system 100 can pause execution of the base motion plan and execute the adjusted motion plan. Once the target package 112 is placed at the adjusted drop location based on executing the adjusted motion plan (i.e., completing execution of the controlled drop), in some embodiments, the robotic system 100 can attempt to regrip the target package 112 as described above for block 720 and then measure the established grip as described above for block 710. In some embodiments, the robotic system 100 can attempt to regrip the target package 112 up to an iteration limit as described above. If the contact measure satisfies the initial grip threshold, the robotic system 100 can reverse the adjusted motion plan (e.g., return to the paused point/location) and continue executing the remaining portions of the paused base motion plan. In some embodiments, the robotic system 100 can update and recalculate the adjusted motion plan from the current location 424 (after regripping) to the task location 116 and execute the adjusted motion plan to finish executing the task.

In some embodiments, the robotic system 100 can update an area log (e.g., a record of open spaces and/or placed objects) for the accessed drop area to reflect the placed target package 112. For example, the robotic system 100 can regenerate the imaging results for the corresponding drop area. In some embodiments, the robotic system 100 can cancel the remaining actions of the base motion plan after executing the controlled drop and placing the target package 112 at the adjusted drop location. In one or more embodiments, the transit drop area can include a pallet or a bin placed on top of one of the transport units 106 of FIG. 1. At a designated time (e.g., when the pallet/bin is full and/or when the incoming pallet/bin is delayed), the corresponding transport unit can go from the drop area to the pickup area. Accordingly, the robotic system 100 can reimplement the method 500, thereby reidentifying the dropped items as the target package 112 and transferring them to the corresponding task location 116.

Once the target package 112 has been placed at the adjusted drop location, the robotic system 100 can repeat the method 700 for a new target object. For example, the robotic system 100 can determine the next object in the pickup area as the target package 112, calculate a new base motion plan to transfer the new target object, etc.

In some embodiments, the robotic system 100 can include a feedback mechanism that updates the path calculating mechanism based on the contact measure 312. For example, as the robotic system 100 implements the actions to regrip the target package 112 with adjusted positions (e.g., as described above for block 720), the robotic system 100 can store the position of the end-effector that produced the contact/force measurements that satisfied the threshold (e.g., as described above for block 712). The robotic system 100 can store the position in association with the target package 112. The robotic system 100 can analyze the stored positions (e.g., using a running window for analyzing a recent set of actions) for gripping the target package 112 when the number of grip failures and/or successful regrip actions reach a threshold. When a predetermined number of regrip actions occur for a specific object, the robotic system 100 can update the motion planning mechanism to place the gripper at a new position (e.g., position corresponding to the highest number of successes) relative to the target package 112.

Based on the operations represented in block 710 and/or block 726 the robotic system 100 (via, e.g., the processors 202) can track a progress of executing the base motion plan. In some embodiments, the robotic system 100 can track the progress according to horizontal transfer of the target package(s) 112. The robotic system 100 can track the progress based on measuring the established grip (block 710) before initiating the horizontal transfer and based on measuring the grip during transfer (block 726) after initiating the horizontal transfer. Accordingly, the robotic system 100 can selectively generate a new set (i.e., different from the base motion plan) of actuator commands, actuator settings, or a combination thereof based on the progress as described above.

In other embodiments, for example, the robotic system 100 can track the progress based on tracking the commands, the settings, or a combination thereof that has been communicated to and/or implemented by the actuation devices 212. Based on the progress, the robotic system 100 can selectively generate the new set of actuator commands, actuator settings, or a combination thereof to execute the regrip response action and/or the controlled drop response action. For example, when the progress is before any horizontal transfer of the target package 112, the robotic system 100 can select the initial grip threshold and execute the operations represented in blocks 712 (via, e.g., function calls or jump instructions) and onward. Also, when the progress is after the horizontal transfer of the target package 112, the robotic system 100 can select the transfer grip threshold and execute the operations represented in blocks 728 (via, e.g., function calls or jump instructions) and onward.

Implementing granular control/manipulation of the target package 112 (i.e., choosing to implement the base motion plan or deviate from it) according to the contact/force measurement and vision-based monitoring, via the imaging data from the vision sensor device 143, provides improved efficiency, speed, and accuracy for transferring the objects. For example, regripping the target packages 112 when the contact measure is below the initial grip threshold or the packages 112 are improperly positioned decreases the likelihood of grip failure occurring during transfer, which decreases the number of objects lost or unintentionally dropped during transfer. The vacuum regions and vacuum levels can be adjusted to maintain the desired grip further enhances handling of the packages 112. Moreover, each lost object requires human interaction to correct the outcome (e.g., move the lost object out of the motion path for subsequent tasks, inspect the lost object for damages, and/or complete the task for the lost object). Thus, reducing the number of lost objects reduces the human effort necessary to implement the tasks and/or the overall operation.

FIGS. 18-21 illustrate stages of robotically gripping and transporting objects according to the method 490 of FIG. 16 or method 700 of FIG. 17 in accordance with one or more embodiments of the present disclosure. FIG. 18 shows the gripper assembly 141 located above a stack of objects. The robotic arm 139 can positioned the gripper assembly 141 directly above targeted objects. A controller can analyze image data from the vision sensor device 143 to identify, for example, the target objects 812a, 812b, as discussed at block 704 of FIG. 17. A plan (e.g., pickup or base plan) can be generated based on collected image data. The plan can be generated based on (a) a carrying capability of the gripper assembly 141 and/or (b) a configuration of target objects.

FIG. 19 shows the lower surface of the gripper assembly 141 overlaying the target objects 812a, 812b and a large non-targeted object 818. Output from the vision sensor device 143 can be analyzed to confirm the position of the gripper assembly 141 relative to the targeted objects. Based on the position of the objects 812a, 812b, the vacuum regions 117a, 117b are identified for drawing a vacuum. In some embodiments, readings from the force sensor 203 are used to confirm the gripper assembly 141 has contacted the upper surfaces of a stack 814 prior to and/or after gripping target objects 812a, 812b.

FIG. 20 shows air being sucked into the vacuum regions 117a, 117b, as indicated by arrows, to hold the target objects 812a, 812b against the gripper assembly 141 without drawing a vacuum (or a substantial vacuum) at the other vacuum region 117c. The vacuum level can be increased or decreased to increase or decrease the compression of the compliant panel(s) 412 (one identified). The vacuum grip can be evaluated as discussed in connection with block 710 of FIG. 17.

FIG. 21 shows the raised gripper assembly 141 securely holding the target objects 812a, 812b. The vision sensor device 143 can be used to monitor the positions of the target objects 812a, 812b. Additionally or alternatively, the force detector assembly 205 can be used to determine information about the load, such as the positions and weight of the target objects 812a, 812b. The vacuum regions 117a, 117b can continue to suck in air to securely hold the targeted objects 812a, 812b. The vacuum grip can be monitored during transfer, as discussed at block 726 of FIG. 17. The applied vacuum can be stopped or reduced to release the objects 812a, 812b. This process can be repeated to transfer each of the objects in the stack.

CONCLUSION

The above Detailed Description of examples of the disclosed technology is not intended to be exhaustive or to limit the disclosed technology to the precise form disclosed above. While specific examples for the disclosed technology are described above for illustrative purposes, various equivalent modifications are possible within the scope of the disclosed technology, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or sub-combinations. Each of these processes or blocks may be implemented in a variety of different ways. Also, while processes or blocks are at times shown as being performed in series, these processes or blocks may instead be performed or implemented in parallel, or may be performed at different times. Further, any specific numbers noted herein are only examples; alternative implementations may employ differing values or ranges.

These and other changes can be made to the disclosed technology in light of the above Detailed Description. While the Detailed Description describes certain examples of the disclosed technology as well as the best mode contemplated, the disclosed technology can be practiced in many ways, no matter how detailed the above description appears in text. Details of the system may vary considerably in its specific implementation, while still being encompassed by the technology disclosed herein. As noted above, particular terminology used when describing certain features or aspects of the disclosed technology should not be taken to imply that the terminology is being redefined herein to be restricted to any specific characteristics, features, or aspects of the disclosed technology with which that terminology is associated. Accordingly, the invention is not limited, except as by the appended claims. In general, the terms used in the following claims should not be construed to limit the disclosed technology to the specific examples disclosed in the specification, unless the above Detailed Description section explicitly defines such terms.

Although certain aspects of the invention are presented below in certain claim forms, the applicant contemplates the various aspects of the invention in any number of claim forms. Accordingly, the applicant reserves the right to pursue additional claims after filing this application to pursue such additional claim forms, in either this application or in a continuing application.

What is claimed is:

1. A method comprising:
    selecting at least one of a plurality of addressable vacuum regions of a gripper assembly of a transport robot based on one or more target objects within a group of objects, wherein the gripper assembly is a multi-gripper assembly having the plurality of addressable vacuum regions that are independently controllable;
    generating commands and/or settings to cause the transport robot to:
        contact the one or more target objects with at least one of the plurality of addressable vacuum regions;
        draw air through the at least one of the plurality of addressable vacuum regions;
        dynamically adjusting a pressure level of air flow through the at least one of the plurality of addressable vacuum regions to grip the one or more target objects using the selected at least one of the plurality of addressable vacuum regions; and
        robotically move the multi-gripper assembly to transport the gripped one or more target objects away from other objects in the group.

2. The method of claim 1, wherein:
    the multi-gripper assembly comprises:
    a gripper mechanism including the at least one of the plurality of addressable vacuum regions, wherein each of the addressable vacuum regions of the gripper mechanism includes a plurality of suction elements and
    a contact member including a plurality of openings that correspond to the plurality of suction elements; and
    generating the commands and/or the settings to press the least one of the plurality of addressable vacuum regions includes operating the transport robot to press at least a portion of the contact member directly on the one or more target objects overlapping the at least one of the addressable vacuum regions.

3. The method of claim 2, wherein:
    each of the plurality of suction elements extend through a corresponding opening in a top plane of the contact member and without extending past a bottom plane of the contact member; and
    generating the commands and/or the settings to press the at least one of the plurality of addressable vacuum regions on the one or more target objects includes operating the transport robot to compress the contact member for enabling the suction elements within the at least one of the addressable vacuum regions to engage the one or more target objects.

4. The method of claim 2, wherein:
- one or more of the suction elements are in fluidic communication with a vacuum line via a vacuum chamber or internal conduit; and
- generating the commands and/or the settings to draw air includes operating the transport robot to draw air through the one or more of the suction elements via the vacuum line.

5. The method of claim 2, wherein generating commands and/or settings to draw air corresponds to operating the transport robot to pull the target object against the contact member.

6. The method of claim 2, wherein:
- the contact member is comprised of one or more compressible materials configured to deform to accommodate surfaces of objects with different geometries; and
- generating the commands and/or the settings to press the at least one of the plurality of addressable vacuum regions includes operating the transport robot to compress the contact member against the one or more target objects.

7. The method of claim 2, wherein:
- the multi-gripper assembly further comprises at least one manifold, each manifold including one or more lines connected to the suction elements of an associated gripper mechanism; and
- generating the commands and/or the settings to draw air includes operating the transport robot to draw air through the one or more lines.

8. The method of claim 7, wherein each of the at least one manifold is configured to distribute suction evenly or unevenly via suction elements of the associated gripper mechanism to produce uniform or nonuniform vacuum gripping forces.

9. A robotic transport system comprising:
- a robotic apparatus;
- a multi-gripper assembly coupled to the robotic arm including:
  - a plurality of addressable vacuum regions, and
  - a manifold assembly configured to fluidically couple each of the addressable vacuum regions to at least one vacuum line such that each addressable vacuum region is capable of independently providing suction to hold a target object while the robotic apparatus moves the multi-gripper assembly carrying the target object; and
- a controller programmed to operate the robotic arm, the multi-gripper assembly, or a combination thereof to:
  - press at least one selected addressable vacuum region of the plurality against the target object; and
  - dynamically adjust a pressure level of air flow through the at least one selected addressable vacuum region of to grip the target object.

10. The robotic transport system of claim 9, wherein each of the addressable vacuum regions of the multi-gripper assembly includes a plurality of suction elements, and the multi-gripper assembly further comprises:
- a contact member including a plurality of openings that correspond to the plurality of suction elements.

11. The robotic transport system of claim 10, wherein each of the plurality of suction elements extend through a corresponding opening in a top plane of the contact member and without extending past a bottom plane of the contact member.

12. The robotic transport system of claim 10, wherein one or more of the plurality of suction elements are in communication with the at least one vacuum line via a vacuum chamber or internal conduit.

13. The robotic transport system of claim 10, wherein the target object is pulled against the contact member when air is drawn through one or more of the plurality of suction elements.

14. The robotic transport system of claim 10, wherein the contact member is comprised of one or more compressible materials configured to deform to accommodate surfaces of objects with different geometries.

15. The robotic transport system of claim 10, the manifold assembly further comprising:
- at least one manifold, each manifold connected to the suction elements of an associated gripper mechanism via vacuum lines of one or more associated addressable vacuum regions.

16. The robotic transport system of claim 15, wherein each of the at least one manifold is configured to distribute suction evenly or unevenly via suction elements of the associated gripper mechanism to produce uniform or nonuniform vacuum gripping forces.

17. An end effector comprising:
- a multi-gripper assembly including:
  - a plurality of addressable vacuum regions defining a vacuum gripping zone, and
  - a manifold assembly configured to fluidically couple each of the plurality of addressable vacuum regions to at least one vacuum line such that each addressable vacuum region is capable of independently providing suction to hold a target object while a robotic apparatus moves the multi-gripper assembly carrying the target object, wherein the suction is dynamically adjusted based on a contact area between an associated addressable vacuum region and the target object.

18. The end effector of claim 17, wherein the multi-gripper assembly further comprises:
- a gripper mechanism including the plurality of addressable vacuum regions, wherein each of the addressable vacuum regions of the gripper mechanism include a plurality of suction elements; and
- a contact member including a plurality of openings that correspond to the plurality of suction elements.

19. The end effector of claim 18, wherein each of the plurality of suction elements extend through a corresponding opening in a top plane of the contact member and without extending past a bottom plane of the contact member.

20. The end effector of claim 18, wherein the manifold assembly is configured to distribute suction evenly or unevenly via the suction elements to produce uniform or nonuniform vacuum gripping forces based on a measurement of contact with the target object.

* * * * *